(12) United States Patent
Kamakura et al.

(10) Patent No.: US 12,656,507 B2
(45) Date of Patent: Jun. 16, 2026

(54) RADIATION DETECTOR, AND RADIATION DETECTOR ARRAY

(71) Applicant: HAMAMATSU PHOTONICS K.K., Hamamatsu (JP)

(72) Inventors: Shogo Kamakura, Hamamatsu (JP); Hayato Nishimiya, Hamamatsu (JP); Shintaro Kamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 173 days.

(21) Appl. No.: 18/725,838

(22) PCT Filed: Nov. 11, 2022

(86) PCT No.: PCT/JP2022/042126
§ 371 (c)(1),
(2) Date: Jul. 1, 2024

(87) PCT Pub. No.: WO2023/132128
PCT Pub. Date: Jul. 13, 2023

(65) Prior Publication Data
US 2025/0093534 A1 Mar. 20, 2025

(30) Foreign Application Priority Data
Jan. 5, 2022 (JP) ................................. 2022-000431

(51) Int. Cl.
G01T 1/20 (2006.01)

(52) U.S. Cl.
CPC ...... G01T 1/20182 (2020.05); G01T 1/20183 (2020.05); G01T 1/20187 (2020.05)

(58) Field of Classification Search
CPC ............. G01T 1/20182; G01T 1/20183; G01T 1/20187; G01T 1/1642
See application file for complete search history.

(56) References Cited

U.S. PATENT DOCUMENTS

2010/0171038 A1* 7/2010 Wirth .................. G01T 1/20182
438/66
2011/0116595 A1* 5/2011 Carmi ...................... G01T 1/18
378/19
(Continued)

FOREIGN PATENT DOCUMENTS

CN 103592671 A 2/2014
DE 102009004119 A1 7/2010
(Continued)

OTHER PUBLICATIONS

International Preliminary Report on Patentability mailed Jul. 18, 2024 for PCT/JP2022/042126.
(Continued)

*Primary Examiner* — Casey Bryant
(74) *Attorney, Agent, or Firm* — Faegre Drinker Biddle & Reath LLP

(57) ABSTRACT

The radiation detector includes a scintillator, first and second semiconductor photodetectors, a first wiring member electrically connected to the first semiconductor photodetector, and a second wiring member electrically connected to the second semiconductor photodetector. The scintillator includes a pair of end surfaces opposing each other in a first direction and first and second side surfaces opposing each other in a second direction intersecting the first direction, and has a rectangular shape when viewed in the first direction. The first and second side surfaces couple the pair of end surfaces. The first semiconductor photodetector includes a first semiconductor substrate disposed to oppose the first side surface. The second semiconductor photodetector includes a second semiconductor substrate disposed to oppose the second side surface.

20 Claims, 17 Drawing Sheets

(56)  References Cited

U.S. PATENT DOCUMENTS

| | | | |
|---|---|---|---|
| 2012/0068050 A1* | 3/2012 | Mazzillo | G01J 1/46 |
| | | | 257/E31.124 |
| 2016/0011323 A1 | 1/2016 | Sasaki et al. | |
| 2021/0003721 A1 | 1/2021 | Loi et al. | |
| 2025/0123412 A1* | 4/2025 | Kamakura | H10F 30/225 |

FOREIGN PATENT DOCUMENTS

| | | | |
|---|---|---|---|
| JP | 2006-343247 A | 12/2006 |
| JP | 2015-083956 A | 4/2015 |
| JP | 2021-019241 A | 2/2021 |
| RU | 2567400 C2 | 11/2015 |
| RU | 2589252 C2 | 7/2016 |

OTHER PUBLICATIONS

European Search Report issued on Nov. 11, 2025 in counterpart EP patent application 22918717.4.

* cited by examiner

RD1

RADIATION DETECTOR, AND RADIATION DETECTOR ARRAY

TECHNICAL FIELD

The present invention relates to a radiation detector and a radiation detector array.

BACKGROUND ART

Known radiation detectors include a scintillator having a hexahedron shape and a semiconductor photodetector including a semiconductor substrate disposed on the scintillator (for example, refer to Patent Literature 1). The scintillator generates a scintillation light in response to entry of radiation. The semiconductor photodetector detects the generated scintillation light.

CITATION LIST

Patent Literature

Patent Literature 1: Japanese Unexamined Patent Publication No. 2015-83956

SUMMARY OF INVENTION

Technical Problem

An object of a first aspect of the present invention is to provide a radiation detector having high time resolution and high detection sensitivity. Objects of second and third aspects of the present invention are to provide a radiation detector array including radiation detectors having high time resolution and high detection sensitivity.

Solution to Problem

The present inventors have intensively studied radiation detectors having high time resolution and high detection sensitivity. As a result, the present inventors have newly obtained the following knowledge and conceived the present invention. Patent Literature 1 does not disclose a radiation detector having high time resolution and high detection sensitivity.

When radiation enters a scintillator that includes a pair of end surfaces opposing each other in a first direction and is longer in the first direction, from one of the pair of end surfaces, the scintillator reliably absorbs the radiation in a high energy range and generates scintillation lights. In a configuration in which a semiconductor photodetector is disposed on another end surface of the pair of end surfaces, the scintillator can easily and reliably absorb the radiation in the high energy range.

The semiconductor photodetector detects the scintillation light emitted from the other end surface. In a configuration in which a length of the scintillator in the first direction is larger than a length of the scintillator in a direction intersecting the first direction, it is difficult to obtain high time resolution. Side surfaces coupling the pair of end surfaces and extending in the first direction are disposed at a shorter distance from the scintillation light generation point than the other end surface is. Therefore, semiconductor photodetectors disposed on the side surfaces extending in the first direction easily detect the scintillation lights with high time resolution. In a radiation detector, it is desirable to arrange the semiconductor photodetectors at positions where individual scintillation lights simultaneously generated at the same position can be detected at a short distance. This arrangement of the semiconductor photodetectors enables incident radiation to be detected with high time resolution.

In a configuration in which the scintillator includes a plurality of side surfaces, the semiconductor photodetectors can be disposed on the plurality of side surfaces, respectively. A radiation detector in which the semiconductor photodetectors are disposed on the plurality of side surfaces, respectively, achieves high detection sensitivity, as compared with a radiation detector in which one semiconductor photodetector is disposed only on one end surface.

A radiation detector according to a first aspect includes: a scintillator including a pair of end surfaces opposing each other in a first direction, and a first side surface and a second side surface opposing each other in a second direction intersecting the first direction and coupling the pair of end surfaces, the scintillator having a rectangular shape when viewed in the first direction; a first semiconductor photodetector including a first semiconductor substrate disposed to oppose the first side surface; a second semiconductor photodetector including a second semiconductor substrate disposed to oppose the second side surface; a first wiring member electrically connected to the first semiconductor photodetector; and a second wiring member electrically connected to the second semiconductor photodetector. A length of the scintillator in the first direction is longer than a length of the scintillator in the second direction and a length of the scintillator in a third direction parallel to the first side surface. A length of the first side surface in the first direction is longer than a width of the first side surface in the third direction. A length of the second side surface in the first direction is longer than a width of the second side surface in the third direction. The first semiconductor substrate includes a first portion covered with the first side surface, and a second portion disposed with the first portion in the first direction and exposed from the first side surface. The second semiconductor substrate includes a third portion covered with the second side surface, and a fourth portion disposed with the third portion in the first direction and exposed from the second side surface. Each of the first semiconductor photodetector and the second semiconductor photodetector includes a plurality of photodetection regions including at least one avalanche photodiode arranged to operate in Geiger mode, and at least one quenching resistor electrically connected in series with one of an anode or a cathode of a corresponding avalanche photodiode of the at least one avalanche photodiode. The first semiconductor photodetector includes a plurality of first electrodes electrically connected to the at least one quenching resistor included in the first semiconductor photodetector and included in a corresponding photodetection region of the plurality of photodetection regions, and a second electrode electrically connected to another of the anode or the cathode of the avalanche photodiode included in the first semiconductor photodetector and included in the corresponding photodetection region of the plurality of photodetection regions. The second semiconductor photodetector includes a plurality of third electrodes electrically connected to the at least one quenching resistor included in the second semiconductor photodetector and included in the corresponding photodetection region of the plurality of photodetection regions, and a fourth electrode electrically connected to another of the anode or the cathode of the avalanche photodiode included in the second semiconductor photodetector and included in the corresponding photodetection region of the plurality of photodetection regions. The plurality of photodetection regions included in the first semiconductor photodetector are disposed in the first portion. The plurality of first electrodes and the second electrode are disposed in the second portion. The plurality of photodetection regions included in the second semiconductor photodetector are disposed in the third portion. The plurality of third electrodes and the fourth electrode are disposed in the fourth portion. The first wiring member includes a plurality of conductors electrically connected to a corresponding first electrode of the plurality of first electrodes, and a conductor connected to the second electrode. The second wiring member includes a plurality of conductors electrically connected to a corresponding third electrode of the plurality of third electrodes, and a conductor connected to the fourth electrode.

According to the first aspect, the radiation detector includes the scintillator that is elongated in the first direction, the first semiconductor substrate disposed on the first side surface of the scintillator, and the second semiconductor substrate disposed on the second side surface of the scintillator. The first semiconductor photodetector detects the scintillation light incident on the first side surface. The second semiconductor photodetector detects the scintillation light incident on the second side surface. A length of the scintillator in the second direction is shorter than a length of the scintillator in the first direction. Therefore, a distance from the scintillation light generation point to each of the first side surface and the second side surface is short. An arrival time of a scintillation light to each of the first and second semiconductor photodetectors is short, and the first aspect achieves high time resolution. The first aspect includes the first semiconductor photodetector and the second semiconductor photodetector. Therefore, the first aspect achieves high detection sensitivity as compared with a radiation detector including a single semiconductor photodetector disposed on one side surface of a scintillator.

The first aspect includes the first semiconductor photodetector and the second semiconductor photodetector, each of which includes the plurality of photodetection regions disposed in the first direction. For example, a distance between the scintillation light generation point and one end surface of the scintillator in the first direction is obtained from a position on the photodetection region where the most scintillation lights are detected, of the plurality of photodetection regions. Therefore, a magnitude of energy of radiation incident on the one end surface the scintillator is accurately measured. As a result, the first aspect achieves detection sensitivity.

In the first aspect, when viewed in the second direction, one region formed by an outline of the plurality of photodetection regions included in the first semiconductor substrate may have an outline shape corresponding to an outline shape of the first side surface. When viewed in the second direction, one region formed by the outline of the plurality of photodetection regions included in the second semiconductor substrate may have an outline shape corresponding to an outline shape of the second side surface.

In a configuration in which the one region formed by outline of the plurality of photodetection regions included in the first semiconductor substrate has the outline shape corresponding to the outline shape of the first side surface, the plurality of photodetection regions tend not to be disposed at positions on the first semiconductor substrate where no scintillation lights can be received. Therefore, increase in dark count and capacitance in the photodetection regions included in the first semiconductor substrate is curbed. In a configuration in which the one region formed by the outline of the plurality of photodetection regions included in the second semiconductor substrate has the shape corresponding to the outline shape of the second side surface, the plurality of photodetection regions tend not to be disposed at positions on the second semiconductor substrate where no scintillation lights can be received. Therefore, increase in dark count and capacitance in the photodetection regions included in the second semiconductor substrate is curbed. These configurations reduce detection errors of scintillation lights. As a result, this configuration reliably improves the time resolution and the detection sensitivity of the first semiconductor photodetector and the second semiconductor photodetector.

In the first aspect, the scintillator may include a plurality of portions disposed independently of each other in the first direction. Each of the plurality of portions may be positioned corresponding to the corresponding photodetection region of the plurality of photodetection regions disposed in each of the first semiconductor substrate and the second semiconductor substrate. Each of the plurality of portions may include a pair of opposing surfaces that oppose each other in the first direction, and a first coupling surface and a second coupling surface that couples the pair of opposing surfaces. The first coupling surface may oppose the first semiconductor substrate. The second coupling surface may oppose the second semiconductor substrate and oppose the first coupling surface in the second direction.

In a configuration in which the scintillator includes the plurality of portions disposed independently of each other in the first direction, the scintillation light generated in each portion is confined in the corresponding portion. The photodetection region corresponding to the portion reliably detects the scintillation light generated in the portion. Therefore, this configuration reliably achieves high detection sensitivity.

In the first aspect, the plurality of portions may be joined to each other.

A configuration in which the plurality of portions are joined to each other improves physical strength of the scintillator. Therefore, this configuration more reliably achieves high detection sensitivity.

The first aspect may include a light reflecting member. The light reflecting member may be disposed between the plurality of portions.

In a configuration in which the light reflecting member is disposed between the plurality of portions, the scintillation light generated in each portion is reliably confined in the corresponding portion. The photodetection region corresponding to the corresponding portion more reliably detects the scintillation light generated in the corresponding portion. Therefore, this configuration still more reliably achieves high detection sensitivity.

In the first aspect, when viewed in the second direction, each of the plurality of photodetection regions included in the first semiconductor substrate may have an outline shape corresponding to an outline shape of the first coupling surface of a corresponding portion of the plurality of portions, the first coupling surface that opposes the first semiconductor substrate. When viewed in the second direction, each of the plurality of photodetection regions included in the second semiconductor substrate may have the outline shape corresponding to the outline shape of the second coupling surface of a corresponding portion of the plurality of portions, the second coupling surface that opposes the second semiconductor substrate.

In a configuration in which each of the plurality of photodetection regions included in the first semiconductor substrate has the outline shape corresponding to the outline shape of the first coupling surface of the corresponding portion of the plurality of portions, the first coupling surface that opposes the first semiconductor substrate, the plurality of photodetection regions tend not to be disposed at positions on the first semiconductor substrate where no scintillation lights can be received. In a configuration in which each of the plurality of photodetection regions included in the second semiconductor substrate has the outline shape corresponding to the outline shape of the second coupling surface of the corresponding portion of the plurality of portions, the second coupling surface that opposes the second semiconductor substrate, the plurality of photodetection regions tend not to be disposed at positions on the second semiconductor substrate where no scintillation lights can be received. Therefore, this configuration curbs increase in dark count and capacitance in the plurality of photodetection regions. As a result, this configuration reliably improves the time resolution and the detection sensitivity of the radiation detector.

In the first aspect, the plurality of photodetection regions may include a first photodetection region and a second photodetection region closer to the second portion than the first photodetection region. A width of a conductive wire electrically connecting the first electrode corresponding to the first photodetection region and the first photodetection region may be larger than a width of a conductive wire electrically connecting the first electrode corresponding to the second photodetection region and the second photodetection region.

In a configuration in which the width of the conductive wire electrically connecting the first electrode corresponding to the first photodetection region and the first photodetection region is larger than the width of the conductive wire electrically connecting the first electrode corresponding to the second photodetection region and the second photodetection region, an electrical resistance difference is reduced. A length of the conductive wire electrically connecting the first electrode corresponding to the first photodetection region and the first photodetection region is longer than a length of the conductive wire electrically connecting the first electrode corresponding to the second photodetection region and the second photodetection region. As the length of the conductive wire increases, the electrical resistance of the conductive wire increases. As the width of the conductive wire increases, the electrical resistance of the conductive wire decreases. Therefore, in a configuration in which a width of a long conductive wire is larger than a width of a short conductive wire, the electrical resistance difference between the electrical resistance of the long conductive wire and the electrical resistance of the short conductive wire is reduced. Therefore, this configuration reliably improves the time resolution and the detection sensitivity of the radiation detector.

The first aspect may include a reinforcement body disposed between the second portion and the fourth portion. The reinforcement body may cover the second portion and the fourth portion and couple the second portion and the fourth portion.

In a configuration in which the reinforcement body disposed between the second portion and the fourth portion is provided, the reinforcement body disposed between the second portion and the fourth portion improves mechanical strength of both the second portion and the fourth portion.

In the first aspect, the first semiconductor substrate may include a first surface opposing the scintillator in the second direction and a second surface opposing the first surface in the second direction. The second semiconductor substrate may include a third surface opposing the scintillator in the second direction and a fourth surface opposing the third surface in the second direction. The second surface and the fourth surface may include polished surfaces.

In a configuration in which the second surface includes the polished surface, the first semiconductor substrate can be thinned by polishing the second surface. In a configuration in which the fourth surface includes a polished surface, the second semiconductor substrate can be thinned by polishing the fourth surface. A size of the radiation detector can be reduced in a thickness direction of the first semiconductor substrate. A size of the radiation detector can be reduced in a thickness direction of the second semiconductor substrate.

The first aspect may include: a first base including a fifth surface and a sixth surface opposing each other in the second direction and be disposed such that the first semiconductor substrate is positioned between the fifth surface and the scintillator; a second base including a seventh surface and an eighth surface opposing each other in the second direction and be disposed such that the second semiconductor substrate is positioned between the seventh surface and the scintillator; a plurality of first terminals disposed on the fifth surface; a second terminal disposed on the fifth surface; a plurality of third terminals disposed on the seventh surface; a fourth terminal disposed on the seventh surface; a first wire electrically connecting each of the plurality of first terminals and each of the first electrodes; a second wire electrically connecting the second terminal and the second electrode; a third wire electrically connecting each of the plurality of third terminals and each of the third electrodes; and a fourth wire electrically connecting the fourth terminal and the fourth electrode. The first base may include a fifth portion covered with the first semiconductor substrate and a sixth portion disposed with the fifth portion in the first direction and exposed from the first semiconductor substrate. The second base may include a seventh portion covered with the second semiconductor substrate and an eighth portion disposed with the seventh portion in the first direction and exposed from the second semiconductor substrate. The first terminals and the second terminal may be positioned on the sixth portion. The third terminals and the fourth terminal may be positioned on the eighth portion.

A configuration in which the first and second bases are provided improves the mechanical strength of the radiation detector. Therefore, this configuration reliably achieves a radiation detector having high mechanical strength.

The first aspect may include: a first cover body disposed such that the first semiconductor substrate is positioned between the first cover body and the scintillator; and a second cover body disposed such that the second semiconductor substrate is positioned between the second cover body and the scintillator. Each of the first cover body and the second cover body may include at least one of a light reflector and an electrical insulator.

For example, a configuration in which each of the first cover body and the second cover body includes the light reflector improves light reflection characteristics of scintillation lights. For example, a configuration in which each of the first cover body and the second cover body includes an electrical insulator improves electrical insulation between the radiation detectors adjacent to each other.

In the first aspect, the first wiring member may be disposed on the same side as the scintillator relative to the first semiconductor substrate. The second wiring member may be disposed on the same side as the scintillator relative to the second semiconductor substrate.

In a configuration in which the first wiring member is disposed on the same side as the scintillator relative to the first semiconductor substrate, a substrate for connecting the first wiring member to the first and second electrodes through, for example, die bonding does not need to be provided. In a configuration in which the second wiring member is disposed on the same side as the scintillator relative to the second semiconductor substrate, a substrate for connecting the second wiring member to the first and second electrodes through, for example, die bonding does not need to be provided. Therefore, this configuration more reliably simplifies the configuration of the radiation detector.

In the first aspect, the first wiring member and the second wiring member and the first semiconductor substrate and the second semiconductor substrate may have flexibility. The flexibility of the first wiring member may be higher than the flexibility of the first semiconductor substrate. The flexibility of the second wiring member may be higher than the flexibility of the second semiconductor substrate.

In a configuration in which the flexibility of the first wiring member is higher than the flexibility of the first semiconductor substrate, vibration of the first wiring member tends not to be transmitted to the first semiconductor substrate. A force from the first wiring member tends not to be applied to the first semiconductor substrate, and the first semiconductor substrate tends not to be physically damaged. In a configuration in which the flexibility of the second wiring member is higher than the flexibility of the second semiconductor substrate, vibration of the second wiring member tends not to be transmitted to the second semiconductor substrate. A force from the second wiring member tends not to be applied to the second semiconductor substrate, and the second semiconductor substrate tends not to be physically damaged. Therefore, this configuration reliably maintains the mechanical strength of the radiation detector.

A radiation detector array according to a second aspect includes a plurality of radiation detectors disposed one-dimensionally. Each of the plurality of radiation detectors is the above-described radiation detector. The scintillator further includes a pair of third side surfaces coupling the pair of end surfaces and coupling the first side surface and the second side surface. Any two radiation detectors adjacent to each other of the plurality of radiation detectors are disposed such that the third side surface of the scintillator included in one radiation detector and the third side surface of the scintillator included in another radiation detector oppose each other.

The second aspect realizes the radiation detector array in which the plurality of radiation detectors having high time resolution and high detection sensitivity are one-dimensionally disposed.

In the second aspect, the first semiconductor photodetectors included in the plurality of radiation detectors may be integrally formed. The second semiconductor photodetectors included in the plurality of radiation detectors may be integrally formed.

A configuration in which the above-described first semiconductor photodetectors are integrally formed and the above-described second semiconductor photodetectors are integrally formed improves mechanical strength of the radiation detector array in which the plurality of radiation detectors are one-dimensionally disposed.

The second aspect may include a plurality of radiation detectors two-dimensionally disposed in the matrix. Each of the plurality of radiation detectors disposed in a row direction of the plurality of radiation detectors may be the above-described radiation detector array. Any two radiation detectors adjacent to each other in a column direction of the plurality of radiation detectors may be disposed such that either the first semiconductor photodetector or the second semiconductor photodetector included in one radiation detector and either the first semiconductor photodetector or the second semiconductor photodetector included in the other radiation detector oppose each other in the column direction.

A configuration in which the plurality of radiation detectors are two-dimensionally disposed in the matrix realizes the radiation detector array in which the radiation detectors having high time resolution and high detection sensitivity are two-dimensionally disposed in the matrix.

A radiation detector array according to a third aspect includes a plurality of radiation detectors disposed one-dimensionally. Each of the plurality of radiation detectors is the above-described radiation detector. The scintillator further includes a pair of third side surfaces coupling the pair of end surfaces and coupling the first side surface and the second side surface. Any two radiation detectors adjacent to each other of the plurality of radiation detectors are disposed such that the third side surface of the scintillator included in one radiation detector and either the first semiconductor photodetector or the second semiconductor photodetector included in the other radiation detector oppose each other.

The third aspect realizes the radiation detector array in which the radiation detectors having high time resolution and high detection sensitivity are one-dimensionally disposed.

The third aspect may include a plurality of radiation detectors two-dimensionally disposed in the matrix. Each of the plurality of radiation detectors disposed in a row direction of the plurality of radiation detectors may be the above-described radiation detector array. Any two radiation detectors adjacent to each other in a column direction of the plurality of radiation detectors may be disposed such that the third side surface of the scintillator included in one radiation detector and either the first semiconductor photodetector or the second semiconductor photodetector included in the other radiation detector oppose each other in the column direction.

A configuration in which the plurality of radiation detectors are two-dimensionally disposed in the matrix realizes the radiation detector array in which the radiation detectors having high time resolution and high detection sensitivity are two-dimensionally disposed in the matrix. In a configuration in which the third side surface and either the first semiconductor photodetector or the second semiconductor photodetector included in the other radiation detector oppose each other in the column direction, the plurality of radiation detectors are two-dimensionally disposed in a smaller space as compared with a configuration in which the first semiconductor photodetector and the second semiconductor photodetector oppose each other.

Advantageous Effects of Invention

A first aspect of the present invention provides a radiation detector having high time resolution and high detection sensitivity. Second and third aspects of the present invention provide radiation detector arrays including the radiation detectors having high time resolution and high detection sensitivity.

DESCRIPTION OF EMBODIMENTS

Figure 1:
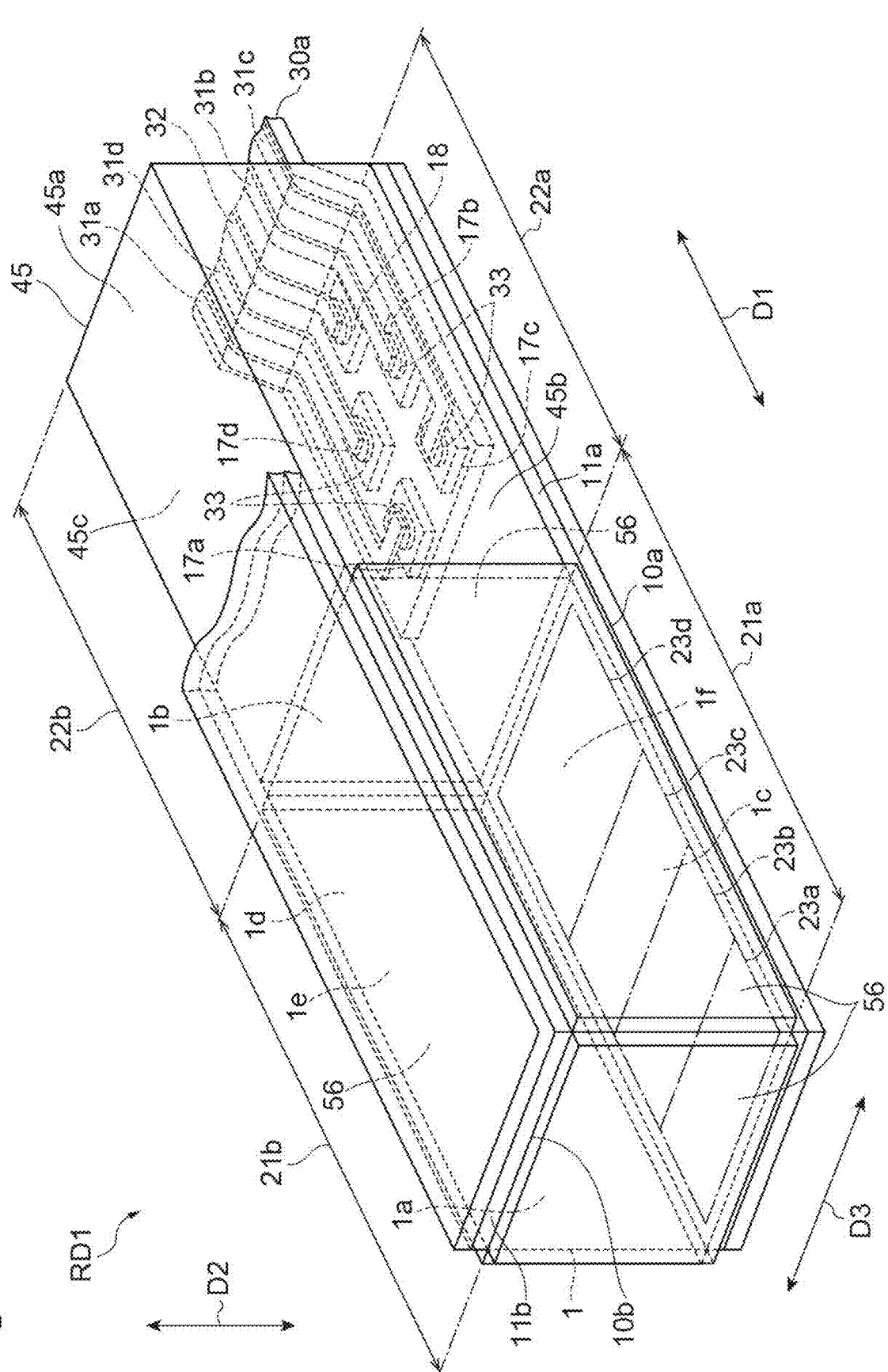
FIG. 1 is a perspective view illustrating a radiation detector according to a first embodiment.

Embodiments of the present invention will be described in detail with reference to the accompanying drawings. Note that, in the description, the same reference numerals will be used for the same elements or elements having the same functions, and redundant description will be omitted.

First Embodiment

Figure 2:
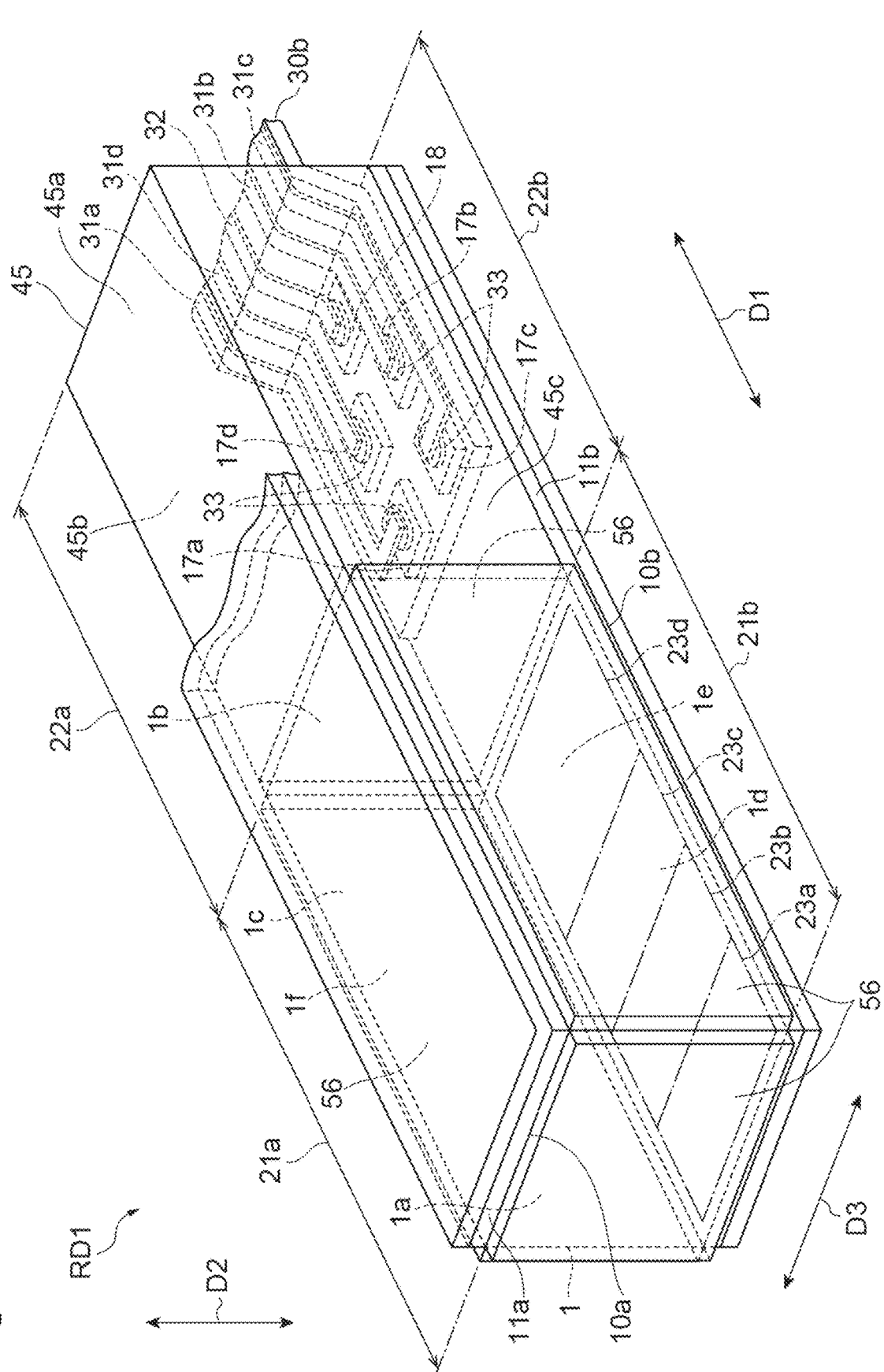
FIG. 2 is a perspective view illustrating the radiation detector according to the first embodiment.
Figure 3:
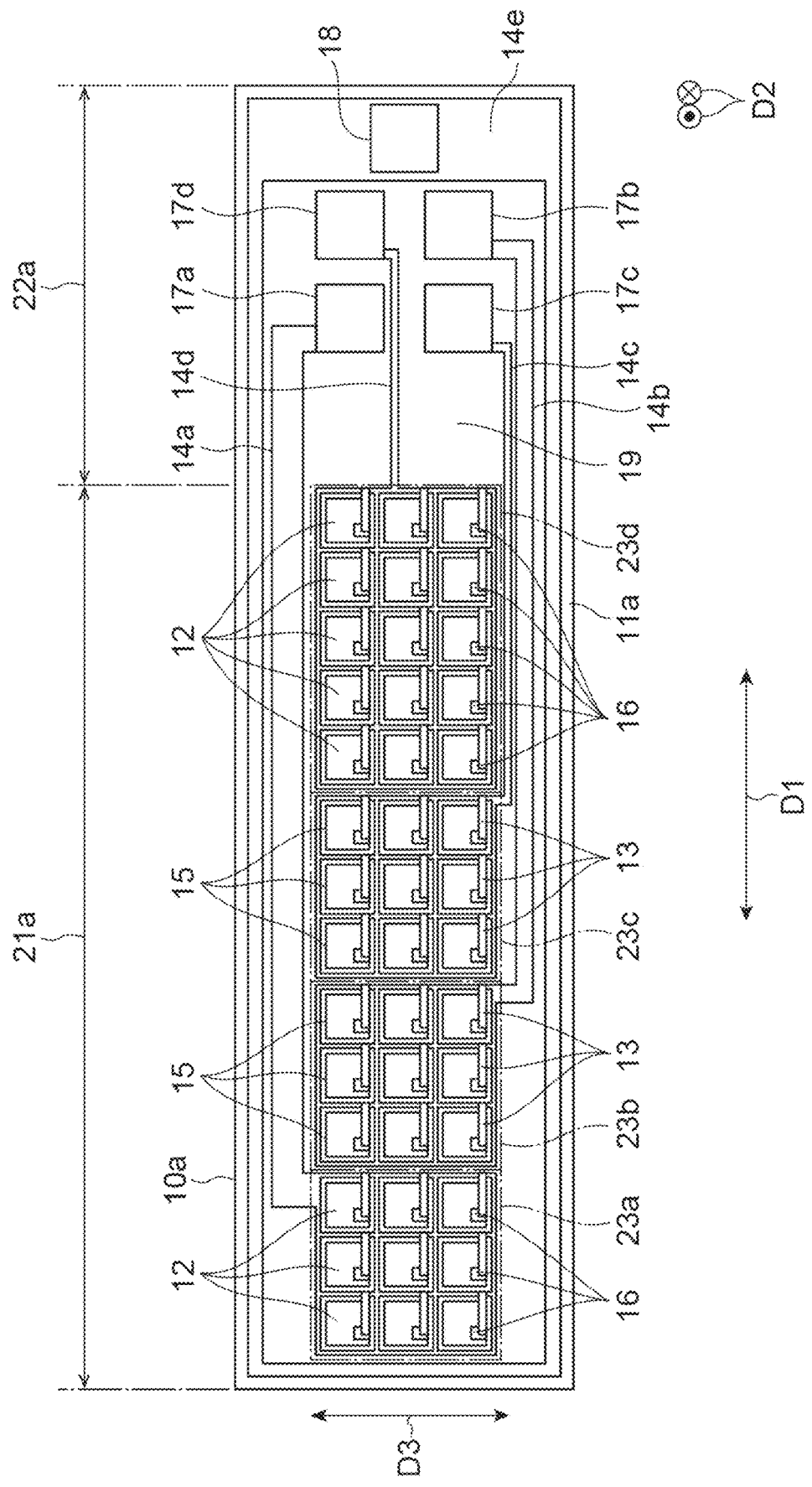
FIG. 3 is a plan view illustrating a first semiconductor photodetector.
Figure 4:
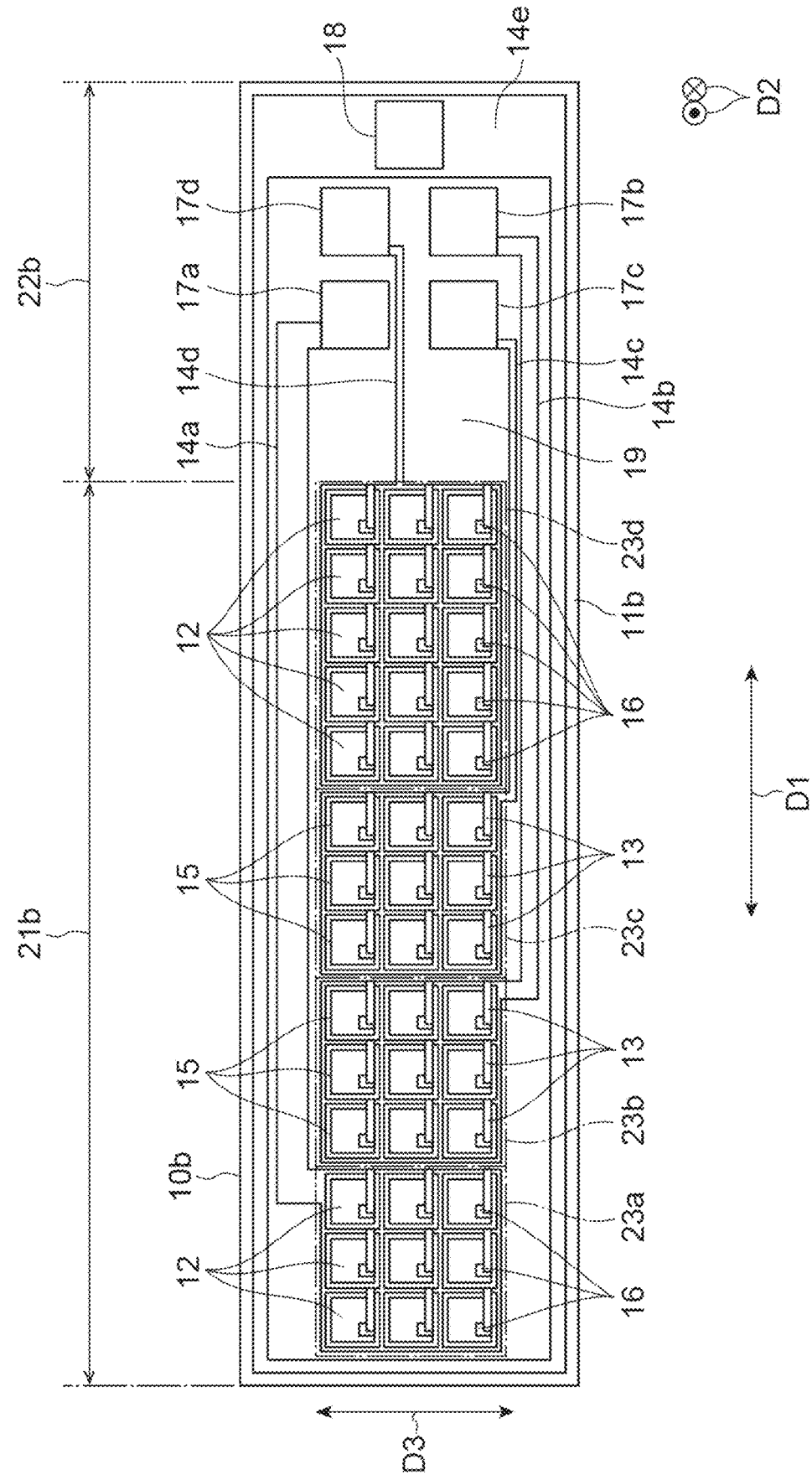
FIG. 4 is a plan view illustrating a second semiconductor photodetector.
Figure 5:
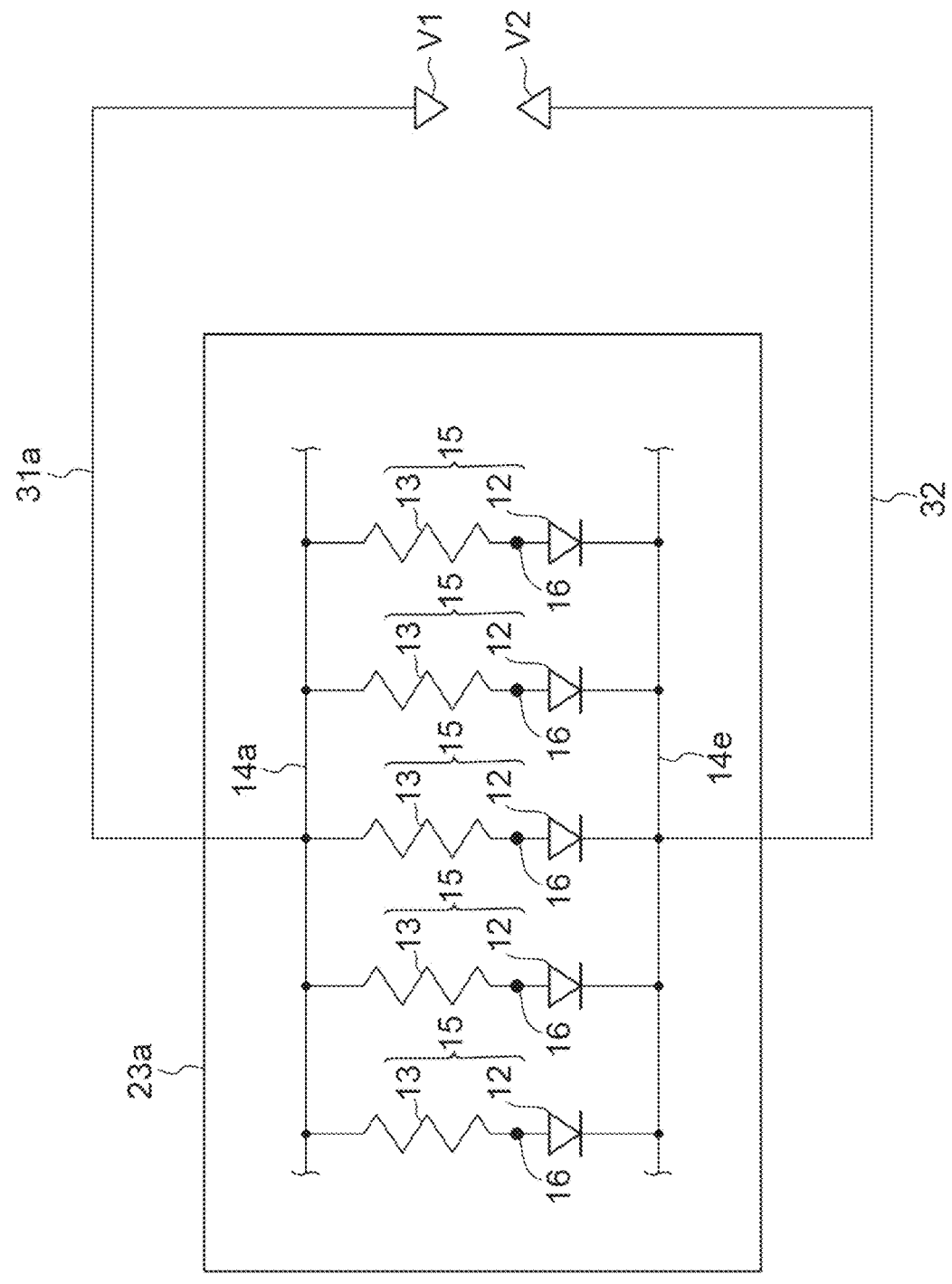
FIG. 5 is a diagram illustrating an equivalent circuit of a photodetection region.
Figure 6:
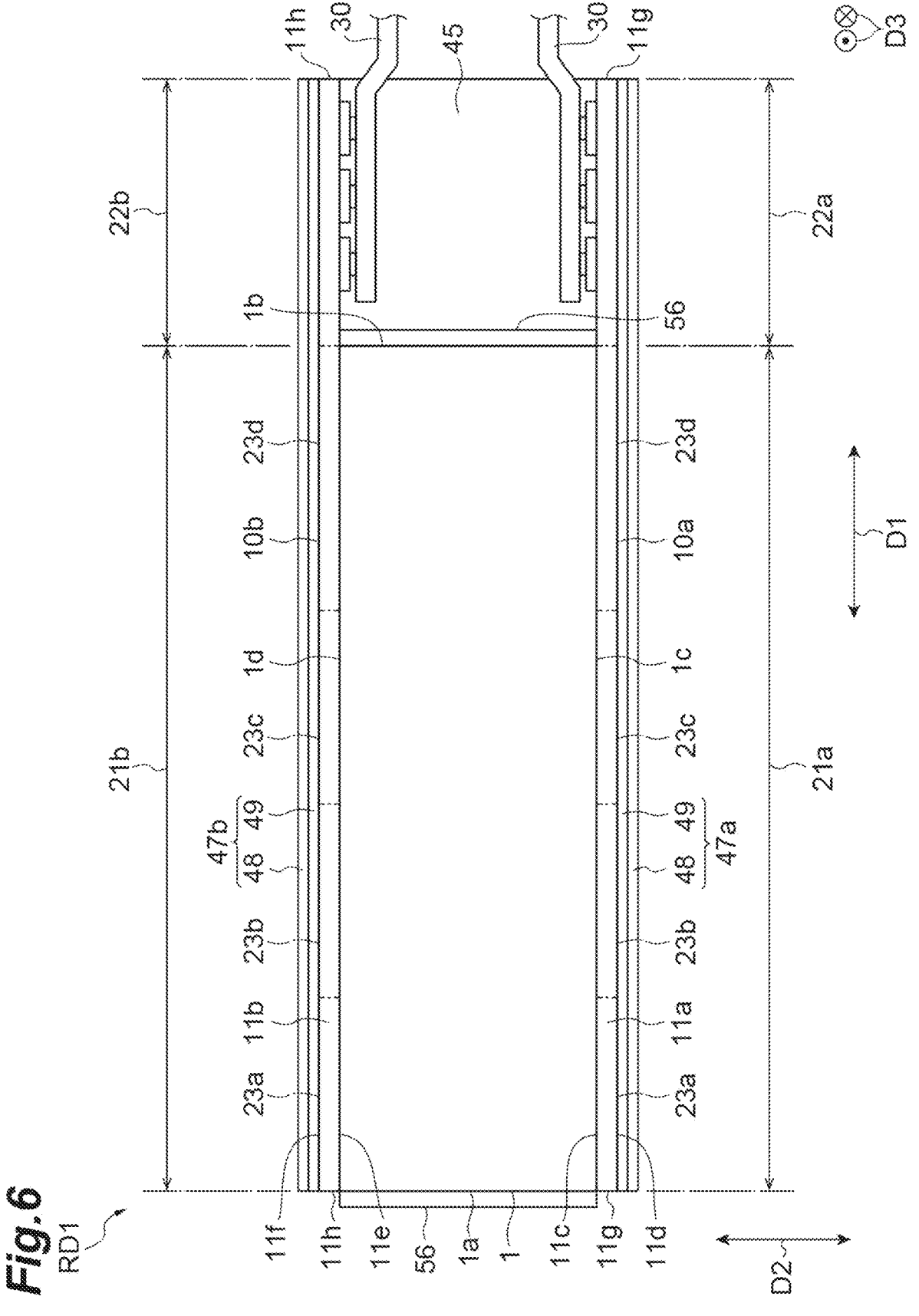
FIG. 6 is a side view illustrating the radiation detector according to the first embodiment.
Figure 7:
FIG. 7 is a side view illustrating the radiation detector according to the first embodiment.
Figure 8:
FIG. 8 is a side view illustrating the radiation detector according to the first embodiment.
Figure 9:
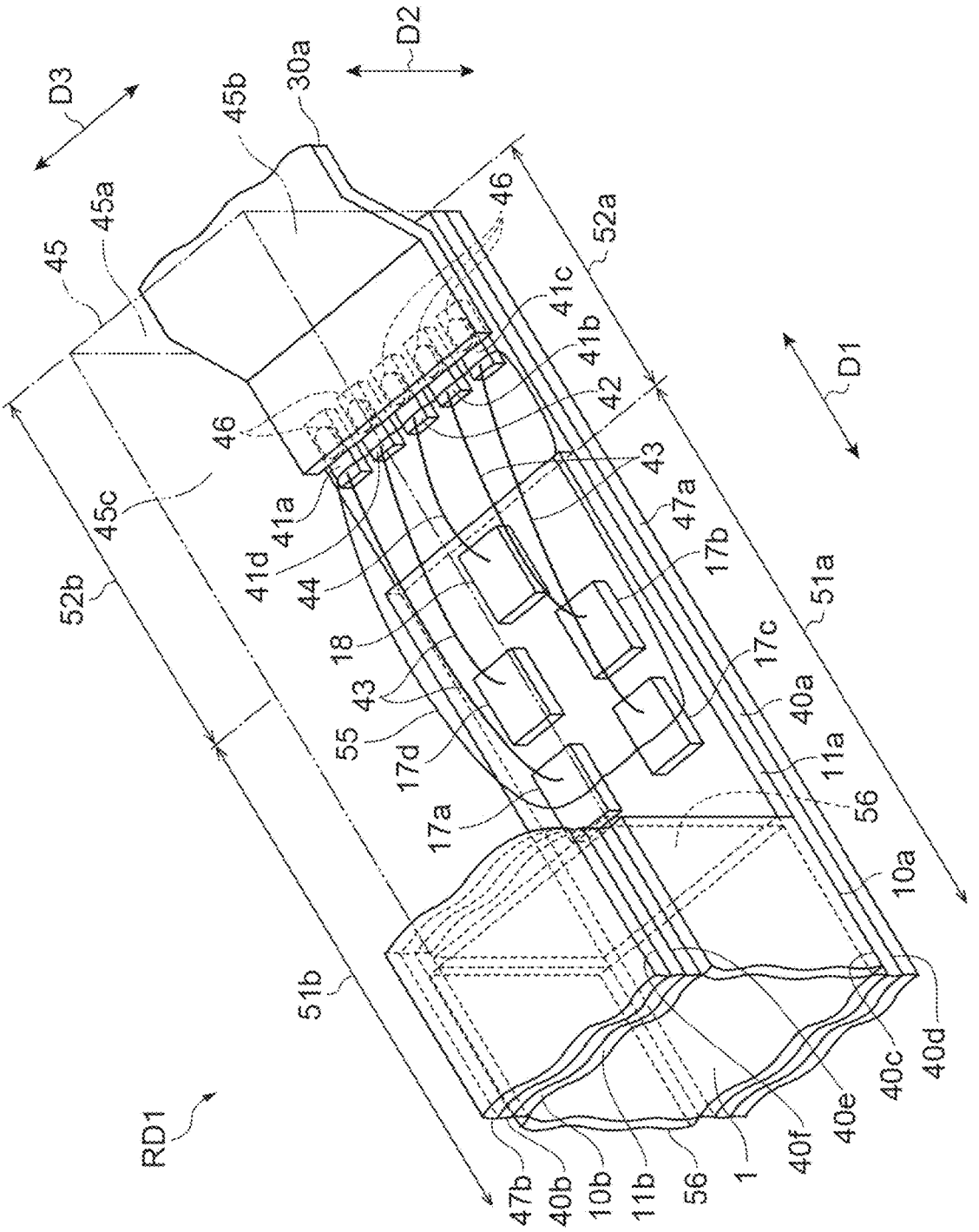
FIG. 9 is a perspective view illustrating the radiation detector according to the first embodiment.
Figure 10:
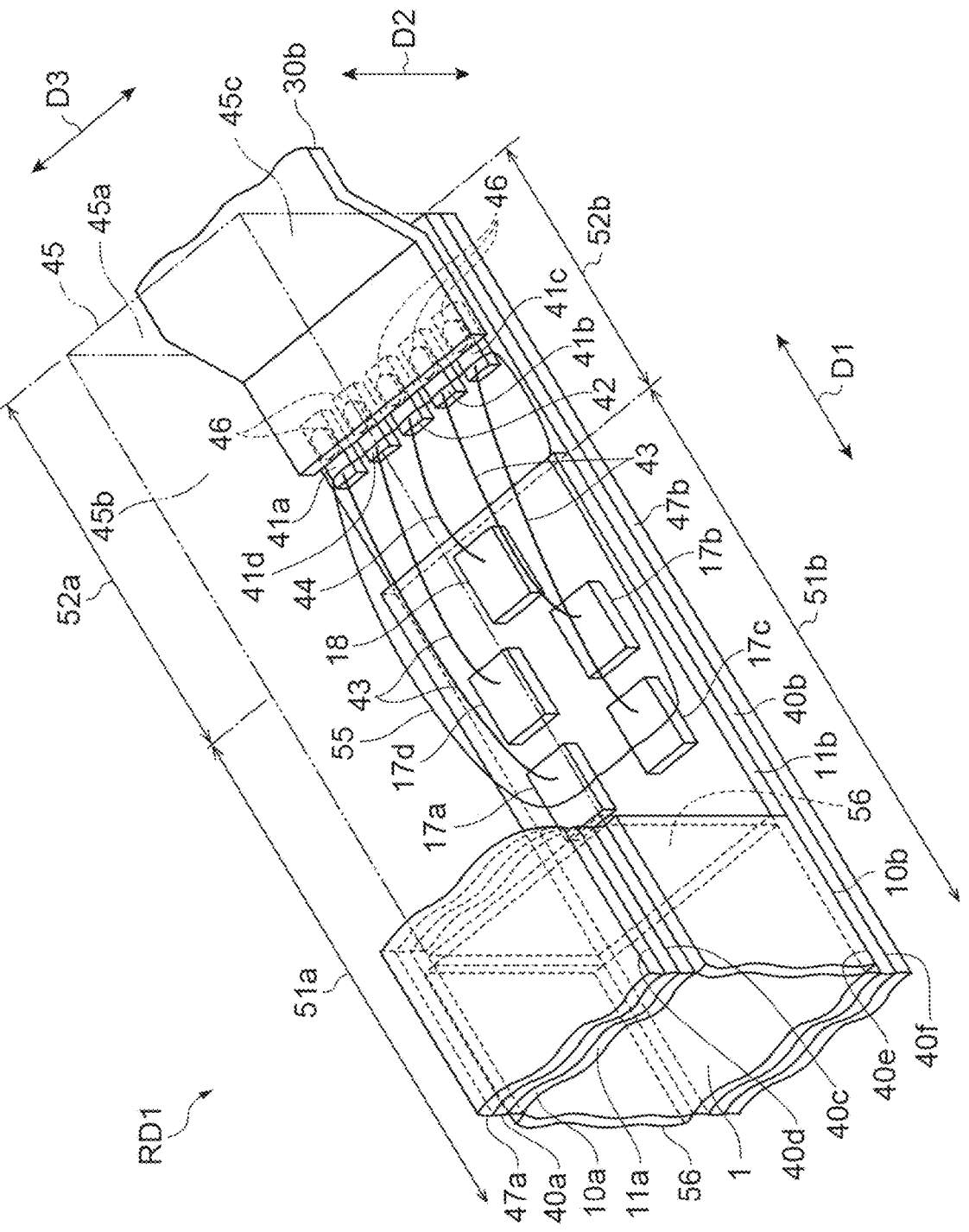
FIG. 10 is a perspective view illustrating the radiation detector according to the first embodiment.

A configuration of a radiation detector RD1 according to a first embodiment will be described with reference to FIGS. 1 to 10. FIGS. 1 and 2 are perspective views illustrating the radiation detector according to the first embodiment. FIG. 3 is a plan view illustrating a first semiconductor photodetector. FIG. 4 is a plan view illustrating a second semiconductor photodetector. FIG. 5 is a diagram illustrating an equivalent circuit of a photodetection region. FIGS. 6 to 8 are side views illustrating the radiation detector according to the first embodiment. FIGS. 9 and 10 are perspective views illustrating the radiation detector according to the first embodiment. In FIGS. 1 and 9, illustration of a part of the second semiconductor photodetector is omitted for the sake of description. In FIGS. 2 and 10, illustration of a part of the first semiconductor photodetector is omitted for the sake of description. FIGS. 9 and 10 illustrate a reinforcement body by a two-dot dashed line.

As illustrated in FIGS. 1 and 2, the radiation detector RD1 includes a scintillator 1, a semiconductor photodetector 10*a*, a semiconductor photodetector 10*b*, a wiring member 30*a*, and a wiring member 30*b*. The scintillator 1 generates a scintillation light in response to entry of radiation on the scintillator 1. The scintillation light contains, for example, fluorescence. The semiconductor photodetectors 10*a* and 10*b* detect scintillation lights generated in the scintillator 1. The semiconductor photodetector 10*a* includes a semiconductor substrate 11*a* and is electrically connected to the wiring member 30*a*. The semiconductor photodetector 10*b* includes a semiconductor substrate 11*b* and is electrically connected to the wiring member 30*b*. For example, when the semiconductor photodetector 10*a* constitutes a first semiconductor photodetector, the semiconductor photodetector 10*b* constitutes a second semiconductor photodetector. For example, when the wiring member 30*a* constitutes a first wiring member, the wiring member 30*b* constitutes a second wiring member. For example, when the semiconductor substrate 11*a* constitutes a first semiconductor substrate, the semiconductor substrate 11*b* constitutes a second semiconductor substrate.

The scintillator 1 includes a pair of end surfaces 1*a* and 1*b* opposing each other, a pair of side surfaces 1*c* and 1*d* opposing each other, and a pair of side surfaces 1*e* and 1*f* opposing each other. The end surfaces 1*a* and 1*b*, the side surfaces 1*c* and 1*d*, and the side surfaces 1*e* and 1*f* constitute outer surfaces of the scintillator 1. The end surfaces 1*a* and 1*b* oppose each other in a first direction D1. The end surfaces 1*a* and 1*b* define both ends of the scintillator 1 in the first direction D1. The side surfaces 1*c* and 1*d* oppose each other in a second direction D2 intersecting the first direction D1 and couple the pair of end surfaces 1*a* and 1*b*. In the present embodiment, the second direction D2 coincides with a direction orthogonal to the side surface 1*c*. The side surfaces 1*c* and 1*d* define both ends of the scintillator 1 in the second direction D2. The side surfaces 1*e* and 1*f* couple the end surfaces 1*a* and 1*b* and couple the side surface 1*c* and the side surface 1*d*. The side surfaces 1*e* and 1*f* oppose each other in a third direction D3 intersecting the first direction D1 and the second direction D2. The third direction D3 corresponds with a direction parallel to the side surface 1*c*. In the present embodiment, the first direction D1, the second direction D2, and the third direction D3 are orthogonal to each other. The side surfaces 1*e* and 1*f* define both ends of the scintillator 1 in the third direction D3. For example, when the side surface 1*c* constitutes a first side surface, the side surface 1*d* constitutes a second side surface, and the side surfaces 1*e* and 1*f* constitute a pair of third side surfaces.

The end surface 1*a* and the end surface 1*b* extend in the second direction D2 to couple the side surface 1*c* and the side surface 1*d*. The end surface 1*a* and the end surface 1*b* extend in the third direction D3 to couple the side surface 1*e* and the side surface 1*f*. The side surface 1*c* and the side surface 1*d* extend in the first direction D1 to couple the end surface 1*a* and the end surface 1*b*. The side surface 1*c* and the side surface 1*d* extend in the third direction D3 to couple the side surface 1*e* and the side surface 1*f*. The side surface 1*e* and the side surface 1*f* extend in the first direction D1 to couple the end surface 1*a* and the end surface 1*b*. The side surface 1*e* and the side surface 1*f* extend in the second direction D2 to couple the side surface 1*c* and the side surface 1*d*. The side surface 1*e* and the side surface 1*f* are adjacent to the side surface 1*c*.

A length of the scintillator 1 in the first direction D1 is longer than a length of the scintillator 1 in the second direction D2. A length of the scintillator 1 in the first direction D1 is longer than a length of the scintillator 1 in the third direction D3. The first direction D1 is a longitudinal direction of the scintillator 1. A length of the side surface 1*c* in the first direction D1 is longer than a width of the side surface 1*c* in the third direction D3. A length of the side surface 1*d* in the first direction D1 is longer than a width of the side surface 1*d* in the third direction D3.

The end surfaces 1*a* and 1*b* each have a rectangular shape when viewed in directions orthogonal to the end surfaces 1*a* and 1*b*. The side surfaces 1*c* and 1*d* each have a rectangular shape when viewed in directions orthogonal to the side surfaces 1*c* and 1*d*. The side surfaces 1*e* and 1*f* each have a rectangular shape when viewed in directions orthogonal to the side surfaces 1*e* and 1*f*. In the present embodiment, the scintillator 1 has a rectangular shape when viewed in the first direction D1, and has a rectangular shape when viewed in the second direction D2 and the third direction D3. The scintillator 1 has, for example, a rectangular parallelepiped shape. The length of the scintillator 1 in the first direction D1 is, for example, about 20 mm. The length of the scintillator 1 in the second direction D2 is, for example, about 4 mm. A length of the scintillator 1 in the third direction D3 is, for example, about 4 mm. The "rectangular shape" in this specification includes, for example, a shape in which each corner is chamfered and a shape in which each corner is rounded. The "rectangular parallelepiped shape" in this specification includes a rectangular parallelepiped shape in which corner portions and ridge portions are chamfered and a rectangular parallelepiped shape in which corner portions and ridge portions are rounded.

The scintillator 1 includes, for example, a crystalline scintillator, a ceramic scintillator, or a plastic scintillator. The crystalline scintillator contains, for example, CsI, NaI, LaBr$_3$, cerium-doped lutetium yttrium orthosilicate (LYSO (Ce)), gadolinium aluminum gallium garnet (GAGG), lutetium oxyorthosilicate (LSO), bismuth germanate (BGO), or ruthenium aluminum garnet (LuAG). The ceramic scintillator contains, for example, a sintered body of an inorganic phosphor. The plastic scintillator contains, for example, polyethylene terephthalate (PET).

The semiconductor substrate 11*a* is disposed to oppose the side surface 1*c*. The semiconductor substrate 11*b* is disposed to oppose the side surface 1*d*. The semiconductor substrates 11*a* and 11*b* contain, for example, Si. The semiconductor substrate 11*b* has the same configuration and the same function as, for example, the semiconductor substrate 11*a* disposed on the side surface 1*c* except that the semiconductor substrate 11*b* is disposed on the side surface 1*d*. The semiconductor substrate 11*a* is disposed on the side surface 1*c* with an adhesive, for example. The semiconductor substrate 11*b* is disposed on the side surface 1*d* with an adhesive, for example.

As illustrated in FIG. 3, the semiconductor substrate 11*a* includes a portion 21*a* and a portion 22*a*. In the present embodiment, the portion 21*a* is covered with the side surface 1*c*. The portion 22*a* is exposed from the side surface 1*c*. The portion 21*a* and the portion 22*a* are disposed in the first direction D1. As illustrated in FIG. 4, the semiconductor substrate 11*b* includes a portion 21*b* and a portion 22*b*. In the present embodiment, the portion 21*b* is covered with the side surface 1*d*. The portion 22*b* is exposed from the side surface 1*d*. The portion 21*b* and the portion 22*b* are disposed in the first direction D1. For example, when the portion 21*a* constitutes a first portion, the portion 22*a* constitutes a second portion. For example, when the portion 21*b* constitutes a third portion, the portion 22*b* constitutes a fourth portion.

Each of the semiconductor photodetector 10*a* and the semiconductor photodetector 10*b* includes a plurality of photodetection regions 23*a*, 23*b*, 23*c*, and 23*d*. The plurality of photodetection regions 23*a*, 23*b*, 23*c*, and 23*d* included in the semiconductor photodetector 10*a* are disposed in the portion 21*a*. The plurality of photodetection regions 23*a*, 23*b*, 23*c*, and 23*d* included in the semiconductor photodetector 10*b* are disposed in the portion 21*b*. The plurality of photodetection regions 23*a*, 23*b*, 23*c*, and 23*d* are disposed in the first direction D1. In the present embodiment, the four photodetection regions 23*a*, 23*b*, 23*c*, and 23*d* are disposed. Each of the plurality of photodetection regions 23*a*, 23*b*, 23*c*, and 23*d* includes at least one avalanche photodiode 12 and at least one quenching resistor 13. In examples illustrated in FIGS. 3 and 4, each of the plurality of photodetection regions 23*a*, 23*b*, 23*c*, and 23*d* includes a plurality of avalanche photodiodes 12 and a plurality of quenching resistors 13. The avalanche photodiode 12 receives the scintillation light and generates photoelectrons from the received scintillation light through photoelectric conversion.

In the portion 21*a*, four conductive wires 14*a*, 14*b*, 14*c*, and 14*d* and a conductive wire 14*e* are disposed. In the portion 21*b*, four conductive wires 14*a*, 14*b*, 14*c*, and 14*d* and a conductive wire 14*e* are disposed. The conductive wires 14*a*, 14*b*, 14*c*, and 14*d* constitute a wiring pattern for signal readout. The conductive wires 14*a*, 14*b*, 14*c*, and 14*d* are patterned in, for example, a grid shape when viewed in the second direction D2. Each of grid-like patterns of the conductive wires 14*a*, 14*b*, 14*c*, and 14*d* surrounds one photodetection unit 15. The one photodetection unit 15 includes one avalanche photodiode 12 and one quenching resistor 13. The one quenching resistor 13 is electrically connected in series with the avalanche photodiode 12 corresponding to the one quenching resistor 13. A plurality of photodetection units 15 are disposed in each of the portion 21*a* and the portion 21*b*. The photodetection units 15 are two-dimensionally disposed in the matrix, for example. In the examples illustrated in FIGS. 3 and 4, the photodetection regions 23*a*, 23*b*, 23*c*, and 23*d* are in contact with each other. In practice, the photodetection regions 23*a*, 23*b*, 23*c*, and 23*d* may be in contact with each other or may be separated from each other. One photodetection unit 15 may be disposed in each of the plurality of photodetection regions 23*a*, 23*b*, 23*c*, and 23*d*. Therefore, each of the plurality of photodetection regions 23*a*, 23*b*, 23*c*, and 23*d* may include one avalanche photodiode 12 and one quenching resistor 13.

The at least one quenching resistor 13 are electrically connected in series with one of an anode or a cathode of a corresponding avalanche photodiode 12 of the at least one avalanche photodiode 12. The avalanche photodiode 12 includes a contact electrode 16. The contact electrode 16 is electrically connected to one of the anode or the cathode. One end of the quenching resistor 13 is electrically connected in series with the contact electrode 16. The other end of each quenching resistor 13 is electrically connected in series with each of the conductive wires 14*a*, 14*b*, 14*c*, and 14*d* constituting the wiring pattern. The conductive wires 14*a*, 14*b*, 14*c*, and 14*d* are electrically connected in parallel to the plurality of quenching resistors 13, respectively. The conductive wire 14*e* is electrically connected in parallel to the other of the anodes and the cathodes of the plurality of avalanche photodiodes 12.

A plurality of electrodes 17*a*, 17*b*, 17*c*, and 17*d* and an electrode 18 are disposed in each of the portion 22*a* and the portion 22*b*. That is, each of the semiconductor photodetectors 10*a* and 10*b* includes the electrodes 17*a*, 17*b*, 17*c*, and 17*d* and the electrode 18. Each of the electrodes 17*a*, 17*b*, 17*c*, and 17*d* is electrically connected to the at least one quenching resistor 13 included in the corresponding photodetection region 23*a*, 23*b*, 23*c*, or 23*d* of the plurality of photodetection regions 23*a*, 23*b*, 23*c*, and 23*d*, via the conductive wires 14a, 14b, 14c, and 14d, respectively. In the examples illustrated in FIGS. 3 and 4, each of the electrodes 17a, 17b, 17c, and 17d is electrically connected in parallel to the plurality of quenching resistors 13 included in the corresponding photodetection region 23a, 23b, 23c, or 23d of the plurality of photodetection regions 23a, 23b, 23c, and 23d, via the conductive wire 14a, 14b, 14c, and 14d, respectively. For example, the electrode 17a is connected to the photodetection region 23a via the conductive wire 14a. The electrode 17b is connected to the photodetection region 23b via the conductive wire 14b. The electrode 17c is connected to the photodetection region 23c via the conductive wire 14c. The electrode 17d is connected to the photodetection region 23d via the conductive wire 14d. In a configuration in which the photodetection regions 23a, 23b, 23c, and 23d each include one quenching resistor 13, the electrodes 17a, 17b, 17c, and 17d are electrically connected in series with the one quenching resistor 13 included in each of the photodetection regions 23a, 23b, 23c, and 23d via the conductive wires 14a, 14b, 14c, and 14d, respectively.

The electrode 18 is electrically connected to the other of the anode or the cathode of the avalanche photodiode 12 included in the corresponding photodetection region 23a, 23b, 23c, or 23d of the plurality of photodetection regions 23a, 23b, 23c, and 23d via the conductive wire 14e. In the examples illustrated in FIGS. 3 and 4, the electrode 18 is electrically connected in parallel to the other of the anodes and the cathodes of the plurality of avalanche photodiodes 12 via the conductive wire 14e. In a configuration in which each of the photodetection regions 23a, 23b, 23c, and 23d includes one avalanche photodiode 12, the electrode 18 is electrically connected in parallel to the other of the anode and the cathode of the one avalanche photodiode 12 included in each of the photodetection regions 23a, 23b, 23c, and 23d, via the conductive wire 14e.

The electrodes 17a, 17b, 17c, and 17d and the electrode 18 contain, for example, aluminum or an aluminum composite. The aluminum composite contains, for example, AlSi, AlCu, or AlSiCu. The electrodes 17a, 17b, 17c, and 17d and the electrode 18 are formed by, for example, a plating method, a vapor deposition method, or a sputtering method.

The electrical resistivity of the quenching resistor 13 is higher than the electrical resistivity of the electrodes 17a, 17b, 17c, and 17d and the electrode 18. The quenching resistor 13 contains, for example, polysilicon. A material of the quenching resistor 13 may include, for example, SiCr, NiCr, or FeCr. The quenching resistor 13 is formed by, for example, a chemical vapor deposition (CVD) method or a sputtering method. For example, in the semiconductor photodetector 10a, when the electrodes 17a, 17b, 17c, and 17d constitute a first electrode, the electrode 18 constitutes a second electrode. For example, in the semiconductor photodetector 10b, when the electrodes 17a, 17b, 17c, and 17d constitute a third electrode, the electrode 18 constitutes a fourth electrode.

In the present embodiment, each of the at least one quenching resistor 13 is electrically connected to, for example, the anode of the corresponding avalanche photodiode 12 of the at least one avalanche photodiode 12. In this case, the electrode 18 is electrically connected to the cathodes of the plurality of avalanche photodiodes 12. The at least one quenching resistor 13 may be electrically connected to the cathode of the corresponding avalanche photodiode 12 of the at least one avalanche photodiode 12. In this case, the electrode 18 is electrically connected to the anodes of the at least one avalanche photodiode 12.

Each avalanche photodiode 12 is arranged to operate in Geiger mode. In Geiger mode, a reverse bias voltage is applied to the avalanche photodiode 12. The reverse bias voltage is, for example, a reverse voltage higher than a breakdown voltage of the avalanche photodiode 12. For example, a potential V1 is applied to the anode of the avalanche photodiode 12, and a potential V2 positive relative to the potential V1 is applied to the cathode of the avalanche photodiode 12. These potentials have relative polarities, and for example, one of the potentials may be a ground potential. The photodetection units 15 are electrically connected in parallel.

Each of the avalanche photodiodes 12 may be a so-called reach-through avalanche photodiode or a so-called reverse avalanche photodiode. The reach-through avalanche photodiode 12 is included in, for example, the radiation detector RD1 including the scintillator 1 that generates the scintillation light having a long wavelength. For example, the reach-through avalanche photodiode is used when the scintillation light is a long-wavelength ray. The reverse avalanche photodiode 12 is used, for example, when the scintillation light is a short-wavelength ray. The reach-through or reverse avalanche photodiode 12 is arranged to operate in Geiger mode. The radiation detector RD1 may include an avalanche photodiode 12 operating in a linear mode. The avalanche photodiode 12 operating in the linear mode may be a so-called reach-through avalanche photodiode or a so-called reverse avalanche photodiode.

On each of the semiconductor substrates 11a and 11b, for example, the conductive wires 14a, 14b, 14c, and 14d, the conductive wire 14e, the electrodes 17a, 17b, 17c, and 17d connected to the conductive wires 14a, 14b, 14c, and 14d, respectively, and the electrode 18 connected to the conductive wire 14e are disposed. On the semiconductor substrates 11a and 11b, for example, an insulating layer 19 is disposed on the conductive wires 14a, 14b, 14c, and 14d and the conductive wire 14e. In the semiconductor substrate 11a, the insulating layer 19 extends over the portion 21a and the portion 22a. In the semiconductor substrate 11b, the insulating layer 19 extends over the portion 21b and the portion 22b. In the portions 22a and 22b, the electrodes 17a, 17b, 17c, and 17d and the conductive wires 14a, 14b, 14c, and 14d are insulated from the electrode 18 and the conductive wire 14e with the insulating layer 19. In the portions 21a and 21b, the insulating layer 19 is formed on the plurality of photodetection units 15. The insulating layer 19 contains, for example, $SiO_2$ or SiN. The insulating layer 19 is formed by, for example, a thermal oxidation method, a sputtering method, or a CVD method.

As illustrated in FIGS. 1, 2, and 6, the wiring member 30a is disposed on the same side as the scintillator 1 relative to the semiconductor substrate 11a, for example. At least a part of the wiring member 30a and the scintillator 1 are disposed in front of the same surface of the semiconductor substrate 11a, for example. The wiring member 30a, the semiconductor substrate 11a, and the scintillator 1 are disposed on a surface 11c. The wiring member 30b is disposed on the same side as the scintillator 1 relative to the semiconductor substrate 11b. At least a part of the wiring member 30b and the scintillator 1 are disposed in front of the same surface of the semiconductor substrate 11b, for example. The wiring member 30b, the semiconductor substrate 11b, and the scintillator 1 are disposed on a surface 11e. The wiring member 30b has the same configuration and the same function as, for example, the wiring member 30a electrically connected to the semiconductor substrate 11a except that the wiring member 30b is electrically connected to the semiconductor substrate 11b.

Each of the wiring members 30a and 30b includes conductors 31a, 31b, 31c, and 31d and a conductor 32. The conductors 31a, 31b, 31c, and 31d included in the wiring member 30a are electrically connected to the electrodes 17a, 17b, 17c, and 17d included in the semiconductor photodetector 10a, respectively. The conductors 31a, 31b, 31c, and 31d included in the wiring member 30b are electrically connected to the electrodes 17a, 17b, 17c, and 17d included in the semiconductor photodetector 10b, respectively. The conductor 32 included in the wiring member 30a is electrically connected to the electrode 18 included in the semiconductor photodetector 10a. The conductor 32 included in the wiring member 30b is electrically connected to the electrode 18 included in the semiconductor photodetector 10b. The conductors 31a, 31b, 31c, and 31d included in the wiring member 30a are electrically connected to the electrodes 17a, 17b, 17c, and 17d included in the semiconductor photodetector 10a via a corresponding conductive bump 33. The conductors 31a, 31b, 31c, and 31d included in the wiring member 30b are electrically connected to the electrodes 17a, 17b, 17c, and 17d included in the semiconductor photodetector 10b via the corresponding conductive bump 33, for example. The conductor 32 included in the wiring member 30a is connected to the electrode 18 included in the semiconductor photodetector 10a via the conductive bump 33, for example. The conductor 32 included in the wiring member 30b is connected to the electrode 18 included in the semiconductor photodetector 10b via the conductive bump 33, for example. The conductive bump 33 includes, for example, solder, an anisotropic conductive film (ACF), or an anisotropic conductive paste (ACP). The solder includes, for example, Sn—Ag—Cu solder. The conductive bump 33 may include, for example, an Au bump, an Ni bump, or a Cu bump.

In the present embodiment, when the radiation detector RD1 is driven, the potential V1 is applied to the anodes of the avalanche photodiodes 12 via the conductors 31a, 31b, 31c, and 31d, and the potential V2 is applied to the cathodes of the avalanche photodiodes 12 via the conductor 32. The potential V1 may be applied to the cathodes of the avalanche photodiodes 12 via the conductor 32, and the potential V2 may be applied to the anodes of the avalanche photodiodes 12 via the conductors 31a, 31b, 31c, and 31d. In FIG. 3, only the conductor 31a is depicted. The conductors 31a, 31b, 31c, and 31d and the conductor 32 contain, for example, Al, Cu, Cu/Ni/Au, or Cu/Ni/Pd/Au. The conductors 31a, 31b, 31c, and 31d and the conductor 32 are formed by, for example, a sputtering method or a plating method.

The wiring member 30a and the wiring member 30b, and the semiconductor substrate 11a and the semiconductor substrate 11b have flexibility. The flexibility of the wiring member 30a is higher than the flexibility of the semiconductor substrate 11a. The flexibility of the wiring member 30b is higher than the flexibility of the semiconductor substrate 11b. The flexibility of the wiring member 30a and the flexibility of the wiring member 30b are equal to each other, for example. The flexibility of the wiring member 30a and the flexibility of the wiring member 30b may be different from each other.

When viewed in the second direction D2, one region including the plurality of photodetection regions 23a, 23b, 23c, and 23d included in the semiconductor substrate 11a is formed along an outline of the side surface 1c. Therefore, a plurality of edges constituting the outline of the photodetection regions 23a, 23b, 23c, and 23d are formed along a corresponding edge of the plurality of edges of the outline of the side surface 1c when viewed in the second direction D2. When viewed in the second direction D2, one region formed by the outline of the plurality of photodetection regions 23a, 23b, 23c, and 23d has a shape corresponding to an outline shape of the side surface 1c. In the semiconductor substrate 11a, the photodetection units 15 are disposed such that the one region including the photodetection regions 23a, 23b, 23c, and 23d has the outline shape corresponding to the outline shape of the side surface 1c, when viewed in the second direction D2. Each of the photodetection regions 23a, 23b, 23c, and 23d has, for example, a rectangular outline shape corresponding to the outline shape of the side surface 1c.

When viewed in the second direction D2, one region including the plurality of photodetection regions 23a, 23b, 23c, and 23d included in the semiconductor substrate 11b is formed along an outline of the side surface 1d. A plurality of edges constituting the outline of the photodetection regions 23a, 23b, 23c, and 23d are formed along a corresponding edge of a plurality of edges of the outline of the side surface 1d when viewed in the second direction D2. When viewed in the second direction D2, one region formed by the outline of the plurality of photodetection regions 23a, 23b, 23c, and 23d has a shape corresponding to an outline shape of the side surface 1d. In the semiconductor substrate 11b, the photodetection units 15 are disposed such that the one region including the photodetection regions 23a, 23b, 23c, and 23d has the outline shape corresponding to the outline shape of the side surface 1d, when viewed in the second direction D2. Each of the photodetection regions 23a, 23b, 23c, and 23d has, for example, a rectangular outline shape corresponding to the outline shape of the side surface 1d.

In the examples illustrated in FIGS. 3 and 4, in the plurality of photodetection regions 23a, 23b, and 23c, three photodetection units 15 are disposed in each column in the first direction D1, and three photodetection units 15 are disposed in each column in the third direction D3. The photodetection region 23a includes a total of nine photodetection units 15. In the photodetection region 23d, five photodetection units 15 are disposed in each column in the first direction D1, and three photodetection units 15 are disposed in each column in the third direction D3. The photodetection region 23d includes a total of fifteen photodetection units 15.

The photodetection regions 23a, 23b, 23c, and 23d are disposed in the first direction D1, for example. In the present embodiment, the photodetection region 23a, the photodetection region 23b, the photodetection region 23c, and the photodetection region 23d are disposed in this order. The photodetection region 23d is closer to the portion 22a or 22b than the photodetection region 23a, the photodetection region 23b, and the photodetection region 23c. The photodetection region 23c is closer to the portion 22a or 22b than the photodetection region 23a and the photodetection region 23b. The photodetection region 23b is closer to the portion 22a or 22b than the photodetection region 23a. In the present embodiment, a width of the conductive wire 14a is larger than any widths of the conductive wires 14b, 14c, and 14d. The width of the conductive wire 14b is larger than any widths of the conductive wires 14c and 14d. The width of the conductive wire 14c is larger than the width of the conductive wire 14d. For example, when viewed in the second direction D2, the conductive wire 14a and the conductive wires 14b and 14c extend between both ends of the semiconductor substrate 11a or 11b in the third direction D3 and the photodetection regions 23*a*, 23*b*, 23*c*, and 23*d*. When viewed in the second direction D2, the conductive wire 14*d* is disposed, for example, between the conductive wire 14*a* and the conductive wires 14*b* and 14*c*. The conductive wires 14*a*, 14*b*, 14*c*, and 14*d* extend in the first direction D1. The widths of the conductive wires 14*a*, 14*b*, 14*c*, and 14*d* are widths in a direction perpendicular to an extending direction of the conductive wires 14*a*, 14*b*, 14*c*, and 14*d*. The widths of the conductive wires 14*a*, 14*b*, 14*c*, and 14*d* are widths in the third direction D3. For example, when the photodetection region 23*a* constitutes a first photodetection region, the photodetection region 23*d* constitutes a second photodetection region.

As illustrated in FIGS. 1 and 2, the radiation detector RD1 includes, for example, a reinforcement body 45. For example, the reinforcement body 45 is disposed between the portion 22*a* and the portion 22*b*. In the present embodiment, the reinforcement body 45 covers the portion 22*a* and the portion 22*b*, and couples the portion 22*a* and the portion 22*b*. The reinforcement body 45 is in contact with the portion 22*a* and the portion 22*b* and the scintillator 1, for example. The reinforcement body 45 includes, for example, surfaces 45*a*, 45*b*, and 45*c*. The surfaces 45*a*, 45*b*, and 45*c* are exposed from the portion 22*a* and the portion 22*b* and the scintillator 1, for example. The surface 45*a* oppose the end surface 1*b* in the first direction D1, for example. The surfaces 45*b* and 45*c* oppose each other in the third direction D3, for example.

The reinforcement body 45 contains, for example, a resin. For example, the resin of the reinforcement body 45 fills a space demarcated by the portion 22*a* and the portion 22*b* and the scintillator 1. The resin of the reinforcement body 45 contains, for example, a thermosetting resin. The resin of the reinforcement body 45 contains, for example, an epoxy resin, a silicone resin, an acrylic resin, a polyimide resin, a phenol resin, or a para-xylylene-based polymer.

In the present embodiment, the reinforcement body 45 includes, for example, a block. The block of the reinforcement body 45 has, for example, a shape corresponding to the space demarcated by the portion 22*a* and the portion 22*b* and the scintillator 1. The block of the reinforcement body 45 includes, for example, a recess formed not to interfere with the wiring member 30*a* and the wiring member 30*b*. The block of the reinforcement body 45 is disposed between the portions 22*a* and 22*b*, for example. In the present embodiment, the block of the reinforcement body 45 is fixed to the portion 22*a* and the portion 22*b* with, for example, an adhesive. The adhesive contains, for example, an epoxy resin, a silicone resin, an acrylic resin, a polyimide resin, or a phenol resin.

The block of the reinforcement body 45 contains, for example, metal. The metal block contains, for example, Al, a titanium alloy, a nickel alloy, or stainless steel. The block of the reinforcement body 45 includes, for example, a glass block. The glass block contains, for example, quartz glass or borosilicate glass. The block of the reinforcement body 45 includes, for example, a ceramic block. The ceramic block includes, for example, alumina, silicon nitride, silicon carbide, sapphire, zirconia, cordierite, yttria, aluminum nitride, cermet, mullite, steatite, or forsterite. The block of the reinforcement body 45 includes, for example, a resin block. The resin block contains, for example, an epoxy resin, a silicone resin, an acrylic resin, a polyimide resin, a phenol resin, or a para-xylylene-based polymer.

As illustrated in FIG. 6, the semiconductor substrate 11*a* includes the surface 11*c* and a surface 11*d* opposing each other in the second direction D2. The surface 11*c* oppose the scintillator 1 in the second direction D2. The surface 11*d* oppose the surface 11*c* in the second direction D2. In the present embodiment, one of the anode and the cathode of each of the avalanche photodiodes 12 is disposed at the surface 11*c*, and the other of the anode and the cathode of each of the avalanche photodiodes 12 is disposed at the surface 11*d*. For example, when the surface 11*c* constitutes the first surface, the surface 11*d* constitutes the second surface.

The semiconductor substrate 11*b* includes the surface 11*e* and a surface 11*f* opposing each other in the second direction D2. The surface 11*e* oppose the scintillator 1 in the second direction D2. The surface 11*f* oppose the surface 11*e* in the second direction D2. In the present embodiment, one of the anode and the cathode of each of the avalanche photodiodes 12 is disposed at the surface 11*e*, and the other of the anode and the cathode of each of the avalanche photodiodes 12 is disposed at the surface 11*f*. For example, when the surface 11*e* constitutes the third surface, the surface 11*f* constitutes the fourth surface.

The surfaces 11*d* and 11*f* include, for example, polished surfaces. For example, after the semiconductor substrates 11*a* and 11*b* are disposed on the scintillator 1, and the reinforcement body 45 is disposed between the portion 22*a* and the portion 22*b*, the surfaces 11*d* and 11*f* are polished. FIG. 7 is a side view illustrating the radiation detector RD1 before the surfaces 11*d* and 11*f* are polished. FIG. 8 is a side view illustrating the radiation detector RD1 after the surfaces 11*d* and 11*f* are polished. As illustrated in FIGS. 7 and 8, in the present embodiment, the surface 11*d* is polished such that the semiconductor substrate 11*a* is thinned, and the surface 11*f* is polished such that the semiconductor substrate 11*b* is thinned.

The surfaces 11*d* and 11*f* are mechanically polished, for example. The surfaces 11*d* and 11*f* are mechanically polished by, for example, a grinding method, a lapping method, or a dry polishing method with a polishing foil. The surfaces 11*d* and 11*f* may be mechanochemically polished. The surfaces 11*d* and 11*f* are chemically polished, for example, by wet polishing with a CMP slurry. In the configuration in which the surfaces 11*d* and 11*f* include polished surfaces, the thicknesses of the semiconductor substrates 11*a* and 11*b* are, for example, 10 to 200 μm. Surface roughness of the polished surfaces is, for example, 0.001 to 200 μm. In this specification, surface roughness of a surface is represented by a maximum height (Rz). The maximum height (Rz) is defined in JIS B 0601:2001 (ISO 4287:1997). Before the surfaces 11*d* and 11*f* are polished, the thicknesses of the semiconductor substrates 11*a* and 11*b* are, for example, 250 to 1,000 μm.

As illustrated in FIGS. 1 and 6, the radiation detector RD1 includes, for example, a cover body 47*a*. The cover body 47*a* is disposed such that the semiconductor substrate 11*a* is positioned between the cover body 47*a* and the scintillator 1. In the present embodiment, the cover body 47*a* is disposed on the surface 11*d*. The cover body 47*a* is disposed on at least a part of the surface 11*d*. The cover body 47*a* may be disposed on the entire surface 11*d*. Therefore, the cover body 47*a* may be disposed only in a region of the surface 11*d* corresponding to the portion 21*a*, or may be disposed in the entire region of the surface 11*d* corresponding to the portion 21*a* and the portion 22*a*. FIGS. 1 and 6 illustrate an example in which the cover body 47*a* is disposed in the entire region of the surface 11*d* corresponding to the portion 21*a* and the portion 22*a*. The radiation detector RD1 does not need to include the cover body 47*a*.

As illustrated in FIGS. 2 and 6, the radiation detector RD1 includes, for example, a cover body 47b. The cover body 47b is disposed such that the semiconductor substrate 11b is positioned between the cover body 47b and the scintillator 1. In the present embodiment, the cover body 47b is disposed on the surface 11f. The cover body 47b is disposed on at least a part of the surface 11f. The cover body 47b may be disposed on the entire surface 11f. Therefore, the cover body 47b may be disposed only in a region of the surface 11f corresponding to the portion 21b, or may be disposed in the entire region of the surface 11f corresponding to the portion 21b and the portion 22b. FIGS. 2 and 6 illustrate an example in which the cover body 47b is disposed in the entire region of the surface 11f corresponding to the portion 21b and the portion 22b. The radiation detector RD1 does not need to include the cover body 47b. For example, when the cover body 47a constitutes the first cover body, the cover body 47b constitutes the second cover body.

Each of the cover bodies 47a and 47b includes, for example, a light reflector 48. The light reflector 48 includes, for example, a film. The film is made of metal, for example. Examples of the metal include Al, Ag, Ti, Pt, Ni, or Au. The light reflector 48 includes, for example, a metallic thin film. The light reflector 48 may include a multilayer optical film or a Teflon (registered trademark) film. The light reflector 48 is formed by, for example, a plating method, a vapor deposition method, or a sputtering method. A thickness of the light reflector 48 is, for example, 0.05 to 100 μm.

The cover bodies 47a and 47b include, for example, an electrical insulator 49. The electrical insulator 49 includes, for example, a film. The film includes, for example, an electrical insulating material. Examples of the electrical insulating material include a silicon compound, an epoxy resin, a silicone resin, an acrylic resin, a polyimide resin, a phenol resin, or a para-xylylene-based polymer. The electrical insulator 49 includes, for example, an electrical insulating thin film. Examples of the silicon compound include $SiO_2$ or SiN. Examples of the polymer include a para-xylylene-based polymer. The electrical insulator 49 is formed by, for example, a chemical vapor deposition (CVD) method, a thermal oxidation method, a sputtering method, a vapor deposition method, or a potting method. The electrical insulator 49 included in the cover body 47a may be formed by, for example, winding an electrical insulation film around the semiconductor substrate 11a disposed on the scintillator 1. The electrical insulator 49 included in the cover body 47b may be formed by, for example, winding an electrical insulation film around the semiconductor substrate 11b disposed on the scintillator 1. A thickness of the electrical insulator 49 is, for example, 0.05 to 100 μm.

Each of the cover bodies 47a and 47b includes, for example, the light reflector 48 and the electrical insulator 49. Each of the cover bodies 47a and 47b has, for example, a two-layer structure including the light reflector 48 and the electrical insulator 49. In a configuration in which the cover bodies 47a and 47b have the two-layer structure, the light reflector 48 may be disposed between the semiconductor substrate 11a and the electrical insulator 49, and the electrical insulator 49 may be disposed between the semiconductor substrate 11a and the light reflector 48. The light reflector 48 may be disposed between the semiconductor substrate 11b and the electrical insulator 49, and the electrical insulator 49 may be disposed between the semiconductor substrate 11b and the light reflector 48. In the present embodiment, each of the cover bodies 47a and 47b includes at least one of the light reflector 48 and the electrical insulator 49. The cover bodies 47a and 47b have, for example, a single-layer structure including only one of the light reflector 48 and the electrical insulator 49. The cover bodies 47a and 47b may have, for example, characteristics of a light reflector and characteristics of an electrical insulator. FIG. 6 illustrates an example in which the electrical insulators 49 are disposed between the semiconductor substrate 11a and the light reflector 48 and between the semiconductor substrate 11b and the light reflector 48.

The cover body 47a is disposed on the surface 11d, for example. The cover body 47a is disposed, for example, on the entire surface 11d and on a side surface 11g. The side surface 11g couples the surface 11c and the surface 11d to each other in the second direction D2, for example. The side surface 11g constitutes, for example, an outer circumferential edge of the cover body 47a when viewed in the second direction D2. The light reflector 48 may be disposed on the entire surface 11d, and the electrical insulator 49 may be disposed on the side surface 11g and on the light reflector 48 disposed on the surface 11d. The cover body 47b is disposed on the surface 11f, for example. The cover body 47b is disposed, for example, on the entire surface 11f and on a side surface 11h. The side surface 11h couples the surface 11e and the surface 11f to each other in the second direction D2. The side surface 11h constitutes, for example, an outer circumferential edge of the cover body 47b when viewed in the second direction D2. The light reflector 48 may be disposed on the entire surface 11f, and the electrical insulator 49 may be disposed on the side surface 11h and on the light reflector 48 disposed on the surface 11f.

In the present embodiment, in a configuration in which a potential of the anode or the cathode of each of the avalanche photodiodes 12 at the surface 11d is the ground potential, the electrical insulator 49 does not need to be disposed on the surface 11d. In a configuration in which a potential of the anode or the cathode of each of the avalanche photodiodes 12 at the surface 11d is not the ground potential, the electrical insulator 49 may be disposed on the surface 11d. In a configuration in which a potential of the anode or the cathode of each of the avalanche photodiodes 12 at the surface 11f is the ground potential, the electrical insulator 49 does not need to be disposed on the surface 11f. In a configuration in which a potential of the anode or the cathode of each of the avalanche photodiodes 12 at the surface 11f is not the ground potential, the electrical insulator 49 may be disposed on the surface 11f.

As illustrated in FIGS. 9 and 10, the radiation detector RD1 includes, for example, a base 40a and a base 40b. The base 40a includes a surface 40c and a surface 40d opposing each other in the second direction D2. The base 40a is disposed such that the semiconductor substrate 11a is positioned between the surface 40c and the scintillator 1. Therefore, at least a part of the wiring member 30a and the scintillator 1 are disposed in front of the same surface of the base 40a, for example. The base 40b includes a surface 40e and a surface 40f opposing each other in the second direction D2. The base 40b is disposed such that the semiconductor substrate 11b is positioned between the surface 40e and the scintillator 1. Therefore, at least a part of the wiring member 30b and the scintillator 1 are disposed in front of the same surface of the base 40b, for example. The base 40b has, for example, the same configuration and the same function as the base 40a. For example, when the base 40a constitutes a first base, the base 40b constitutes a second base. For example, when the surface 40c constitutes a fifth surface, the surface 40d constitutes a sixth surface. For example, when the surface 40e constitutes a seventh surface, the surface 40f constitutes an eighth surface.

The base 40a includes a portion 51a and a portion 52a. The portion 51a is covered with the semiconductor substrate 11a. The portion 52a is exposed from the semiconductor substrate 11a. The portion 51a and the portion 52a are disposed in the first direction D1. The base 40b includes a portion 51b and a portion 52b. The portion 51b is covered with the semiconductor substrate 11b. The portion 52b is exposed from the semiconductor substrate 11b. The portion 51b and the portion 52b are disposed in the first direction D1. For example, when the portion 51a constitutes a fifth portion, the portion 52a constitutes a sixth portion. For example, when the portion 51b constitutes a seventh portion, the portion 52b constitutes an eighth portion.

The radiation detector RD1 includes, for example, terminals 41a, 41b, 41c, and 41d, terminals 42, wires 43, and wires 44. On the base 40a, the terminals 41a, 41b, 41c, and 41d and the terminal 42 are disposed on the surface 40c. The terminals 41a, 41b, 41c, and 41d and the terminal 42 are disposed, for example, on the same side as the scintillator 1 relative to the semiconductor substrate 11a. That is, the terminals 41a, 41b, 41c, and 41d and the scintillator 1 are disposed in front of the same surface of the corresponding base 40a. The terminal 42 and the scintillator 1 are disposed in front of the same surface of the corresponding base 40a. The terminals 41a, 41b, 41c, and 41d disposed on the base 40a are positioned on the portion 52a and are electrically connected to the electrode 17 included in the semiconductor photodetector 10a through the wire 43. The terminal 42 disposed on the base 40a is positioned on the portion 52a and is electrically connected to the electrode 18 included in the semiconductor photodetector 10a through the wire 44.

The wires 43 and 44 are covered and protected with, for example, the resin of the reinforcement body 45. The wiring member 30a is electrically connected to the electrodes 17a, 17b, 17c, and 17d and the electrode 18 included in the semiconductor photodetector 10a via the corresponding conductive bump 46. On the base 40a, for example, when the terminals 41a, 41b, 41c, and 41d constitute a first terminal, the terminal 42 constitutes a second terminal. On the base 40a, for example, when the wire 43 constitutes a first wire, the wire 44 constitutes a second wire. The wires 43 and 44 may be protected with the block of reinforcement body 45, for example.

On the base 40b, the terminals 41a, 41b, 41c, and 41d and the terminal 42 are disposed on the surface 40e. The terminals 41a, 41b, 41c, and 41d and the terminal 42 are disposed, for example, on the same side as the scintillator 1 relative to the semiconductor substrate 11b. That is, the terminals 41a, 41b, 41c, and 41d and the scintillator 1 are disposed in front of the same surface of the corresponding base 40b. The terminal 42 and the scintillator 1 are disposed in front of the same surface of the corresponding base 40b. The terminals 41a, 41b, 41c, and 41d disposed on the base 40b are positioned on the portion 52b and are electrically connected to the electrodes 17a, 17b, 17c, and 17d included in the semiconductor photodetector 10b through the wire 43. The terminal 42 disposed on the base 40b is positioned on the portion 52b and is electrically connected to the electrode 18 included in the semiconductor photodetector 10b through the wire 44.

The wires 43 and 44 are covered and protected with, for example, the resin of the reinforcement body 45. The wiring member 30b is electrically connected to the electrodes 17a, 17b, 17c, and 17d and the electrode 18 included in the semiconductor photodetector 10b via the corresponding conductive bump 46. On the base 40b, for example, when the terminals 41a, 41b, 41c, and 41d constitute a third terminal, the terminal 42 constitutes a fourth terminal. On the base 40b, for example, when the wire 43 constitutes a third wire, the wire 44 constitutes a fourth wire. In the present embodiment, the terminals 41a, 41b, 41c, and 41d of the base 40b have the same configuration and function as the terminals 41a, 41b, 41c, and 41d of the base 40a, and the terminal 42 of the base 40b has the same configuration and function as the terminal 42 of the base 40a. The radiation detector RD1 does not need to include one of the base 40a and the base 40b, and does not need to include the base 40a and the base 40b. The wires 43 and 44 may be protected with the block of reinforcement body 45, for example.

The radiation detector RD1 includes, for example, resins 55. The resins 55 cover the wire 43 and the wire 44 individually or cover both the wire 43 and the wire 44. In the configuration in which the resins 55 cover the wire 43 and the wire 44 individually, the resins 55 may be separated from each other or connected to each other. In this specification, that the "resin 55 covers the wire 43" also means that the resin covers both a connection position between the terminals 41 and the wire 43 and a connection position between the electrodes 17a, 17b, 17c, and 17d and the wire 43. In addition, that the "resin 55 covers the wire 44" also means that the resin covers both a connection position between the terminal 42 and the wire 44 and a connection position between the electrode 18 and the wire 44. In the present embodiment, the resin of the reinforcement body 45 is disposed between the portion 22a and the portion 22b, for example, to cover the resins 55. The radiation detector RD1 does not need to include the resins 55. FIGS. 9 and 10 illustrate an example in which the radiation detector RD1 includes the resins 55. The block of reinforcement body 45 may be disposed between the portions 22a and 22b to cover the resins 55.

The configuration in which the radiation detector RD1 includes the base 40a includes, for example, the cover body 47a. The cover body 47a is disposed on the surface 40d. In this configuration, the scintillator 1, the semiconductor substrate 11a, the base 40a, and the cover body 47a are disposed in the order of the scintillator 1, the semiconductor substrate 11a, the base 40a, and the cover body 47a. Therefore, the cover body 47a is disposed such that the semiconductor substrate 11a and the base 40a are positioned between the cover body 47a and the scintillator 1. The configuration in which the radiation detector RD1 includes the base 40b includes, for example, the cover body 47b. The cover body 47b is disposed on the surface 40f. In this configuration, the scintillator 1, the semiconductor substrate 11b, the base 40b, and the cover body 47b are disposed in the order of the scintillator 1, the semiconductor substrate 11b, the base 40b, and the cover body 47b. Therefore, the cover body 47b is disposed such that the semiconductor substrate 11b and the base 40b are positioned between the cover body 47b and the scintillator 1. The radiation detector RD1 does not need to include at least one of the cover body 47a and the cover body 47b.

As illustrated in FIGS. 1, 2, and 6, the radiation detector RD1 includes, for example, a light reflector 56. For example, the light reflector 56 is disposed on at least one of the end surfaces 1a and 1b and the side surfaces 1e and 1f of the scintillator 1. In the present embodiment, the light reflectors 56 are disposed on all of the end surfaces 1a and 1b and the side surfaces 1e and 1f. The light reflector 56 reflects the scintillation light such that the scintillation light incident on the end surfaces 1a and 1b and the side surfaces 1e and 1f is not emitted outside the scintillator 1. A material and a thickness of the light reflector 56 are, for example, the same as the material and thickness of the light reflector 48. For example, the light reflector 56 is formed by the same method as the light reflector 48. The radiation detector RD1 does not need to include the light reflector 56.

Figure 11:
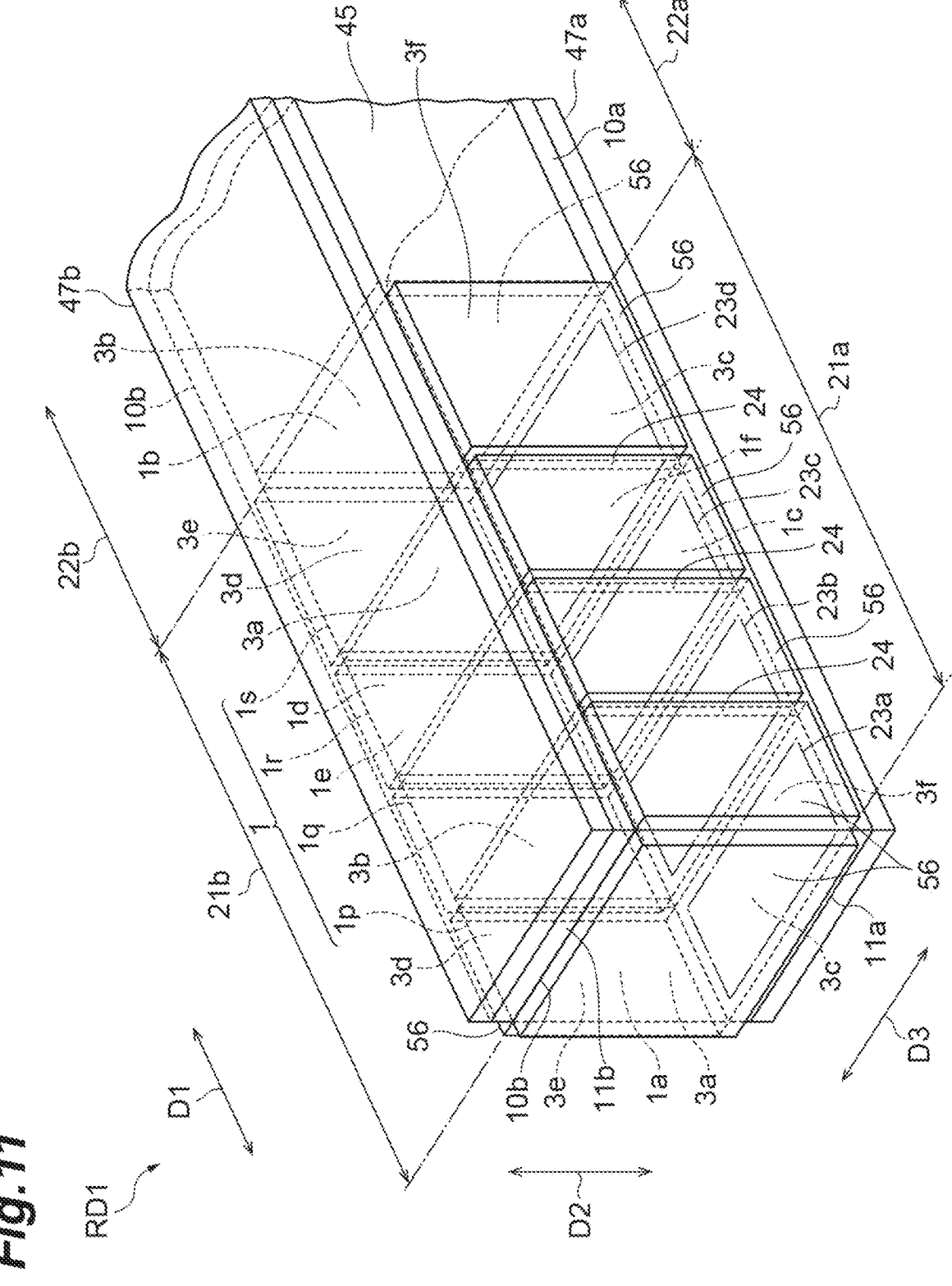
FIG. 11 is a perspective view illustrating a radiation detector according to a modification example of the first embodiment.
Figure 12:
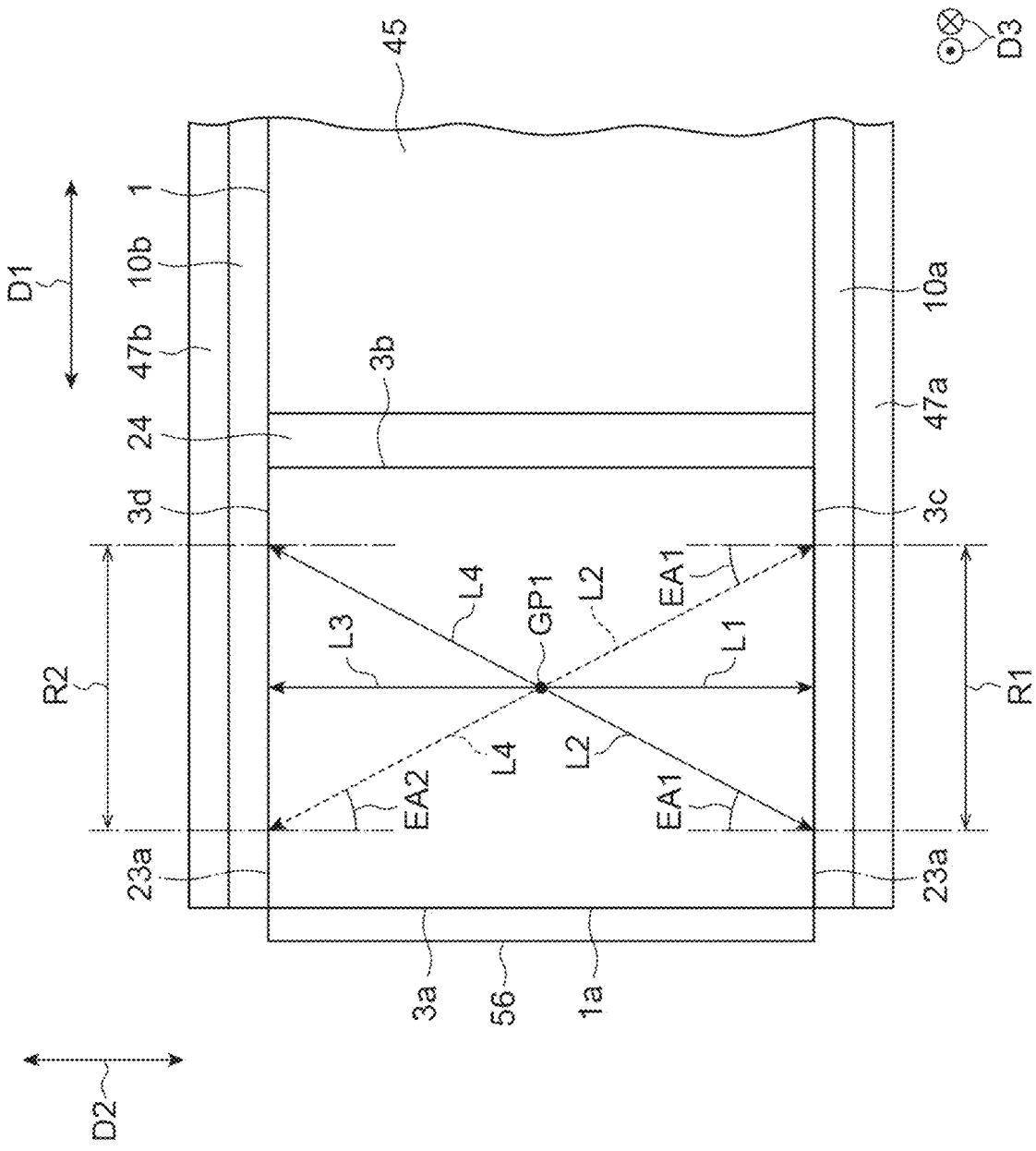
FIG. 12 is a view illustrating paths of some scintillation lights.

A radiation detector RD1 according to a modification example of the first embodiment will be described with reference to FIGS. 11 and 12. FIG. 11 is a perspective view illustrating the radiation detector RD1 according to the modification example of the first embodiment. FIG. 12 is a view illustrating paths of some scintillation lights. FIG. 12 illustrates the paths of some scintillation lights when the scintillator 1 is viewed in the third direction D3. The radiation detector RD1 according to the present modification example has the same configuration as the radiation detector RD1 according to the first embodiment except for a configuration of the scintillator 1.

As illustrated in FIG. 11, the scintillator 1 according to the modification example includes a plurality of portions 1p, 1q, 1r, and 1s. Each of the plurality of portions 1p, 1q, 1r, and 1s is positioned corresponding to the photodetection region 23a, 23b, 23c, or 23d of the plurality of photodetection regions 23a, 23b, 23c, and 23d disposed in each of the semiconductor substrate 11a and the semiconductor substrate 11b. The plurality of portions 1p, 1q, 1r, and 1s correspond to a plurality of photodetection regions 23a, 23b, 23c, and 23d, respectively. The portion 1p corresponds to the photodetection region 23a. The portion 1q corresponds to the photodetection region 23b. The portion 1r corresponds to the photodetection region 23c. The portion 1s corresponds to the photodetection region 23d. The plurality of portions 1p, 1q, 1r, and 1s are disposed independently of each other.

The portions 1p, 1q, 1r, and 1s include a pair of opposing surfaces 3a and 3b that oppose each other, a pair of coupling surfaces 3c and 3d that oppose each other, and a pair of coupling surfaces 3e and 3f that oppose each other. The opposing surfaces 3a and 3b, the coupling surfaces 3c and 3d, and the coupling surfaces 3e and 3f constitute outer surfaces of the portions 1p, 1q, 1r, and 1s. The opposing surfaces 3a and 3b oppose each other in the first direction D1. The first direction D1 is a longitudinal direction of the scintillator 1. The coupling surfaces 3c and 3d oppose each other in the second direction D2. The coupling surface 3d oppose the coupling surface 3c in the second direction D2. The second direction D2 coincides with a direction orthogonal to the coupling surface 3c. The coupling surfaces 3e and 3f oppose each other in the third direction D3. In the present modification example, the opposing surface 3a of the portion 1p coincides with the end surface 1a of the scintillator 1. The opposing surface 3b of the portion 1s coincides with the end surface 1b of the scintillator 1. The coupling surfaces 3c of the portions 1p, 1q, 1r, and 1s all constitute a side surface 1c of the scintillator 1. The coupling surfaces 3d of the portions 1p, 1q, 1r, and 1s all constitute a side surface 1d of the scintillator 1. The coupling surfaces 3e of the portions 1p, 1q, 1r, and 1s all constitute a side surface 1e of the scintillator 1. The coupling surfaces 3f of the portions 1p, 1q, 1r, and 1s all constitute a side surface 1f of the scintillator 1. For example, when the coupling surface 3c constitutes the first coupling surface, the coupling surface 3d constitutes a second coupling surface.

The opposing surface 3a and the opposing surface 3b extend in the second direction D2 to couple the coupling surface 3c and the coupling surface 3d. The opposing surface 3a and the opposing surface 3b extend in the third direction D3 to couple the coupling surface 3e and the coupling surface 3f. The coupling surface 3c and the coupling surface 3d extend in the first direction D1 to couple the opposing surface 3a and the opposing surface 3b. The coupling surface 3c and the coupling surface 3d extend in the third direction D3 to couple the coupling surface 3e and the coupling surface 3f. The coupling surface 3e and the coupling surface 3f extend in the first direction D1 to couple the opposing surface 3a and the opposing surface 3b. The coupling surface 3e and the coupling surface 3f extend in the second direction D2 to couple the coupling surface 3c and the coupling surface 3d. The coupling surface 3e and the coupling surface 3f are adjacent to the coupling surface 3c.

In the present modification example, the opposing surfaces 3a and 3b each have, for example, a rectangular shape when viewed in directions orthogonal to the opposing surfaces 3a and 3b. The coupling surfaces 3c and 3d each have, for example, a rectangular shape when viewed in directions orthogonal to the coupling surfaces 3c and 3d. The coupling surfaces 3e and 3f each have, for example, a rectangular shape when viewed in directions orthogonal to the coupling surfaces 3e and 3f. The portions 1p, 1q, 1r, and 1s have a rectangular shape when viewed in the second direction D2 and the third direction D3. The portions 1p, 1q, 1r, and 1s have a rectangular shape when viewed in the first direction D1.

In the present modification example, the portions 1p, 1q, 1r, and 1s are disposed in the first direction D1. A length of the portions 1p, 1q, 1r, and 1s in the first direction D1 is, for example, about 0.05 to 100 mm. A length of the portions 1p, 1q, 1r, and 1s in the second direction D2 are, for example, about 0.05 to 20 mm. A length of the portions 1p, 1q, 1r, and 1s in the third direction D3 are, for example, about 0.05 to 20 mm. The portions 1p, 1q, 1r, and 1s may have different sizes. For example, of the plurality of portions 1p, 1q, 1r, and 1s, some portions 1p, 1q, and 1r may have substantially the same size, and another portion 1s may have a different size from that of the portions 1p, 1q, and 1r. Some portions 1p and 1q may have substantially the same size, and the other portions 1r and 1s may be different from the portions 1p and 1q and have substantially the same size. The portions 1p, 1q, 1r, and 1s may have substantially the same size.

A total length of the portions 1p, 1q, 1r, and 1s in the first direction D1 is longer than a length of each of the portions 1p, 1q, 1r, and 1s in the second direction D2. Therefore, the total length of the portions 1p, 1q, 1r, and 1s in the first direction D1 is longer than the length of any portion 1p, 1q, 1r, or 1s having the maximum length in the second direction D2 of the portions 1p, 1q, 1r, and 1s. The total length of the portions 1p, 1q, 1r, and 1s in the first direction D1 is longer than the length of any portion 1p, 1q, 1r, or 1s having the maximum length in the third direction D3 of the portions 1p, 1q, 1r, and 1s.

The portions 1p, 1q, 1r, and 1s contain, for example, the same material as that of the scintillator 1 according to the first embodiment. The portions 1p, 1q, 1r, and 1s contain, for example, the same material. The portions 1p, 1q, 1r, and 1s may contain different materials from each other, of the materials contained in the scintillator 1 according to the first embodiment. Therefore, of the materials of the scintillator 1 according to the first embodiment, for example, the portions 1p and 1r may contain the same material, and the portions 1q and 1s may contain the same material. In this case, the material contained in the portions 1p and 1r is different from the material contained in the portions 1q and 1s.

The portions 1p, 1q, 1r, and 1s are joined to each other, for example. The opposing surface 3b of the portion 1p is joined to the opposing surface 3a of the portion 1q, for example. The opposing surface 3b of the portion 1q is joined to the opposing surface 3a of the portion 1r, for example.

The opposing surface 3b of the portion 1r is joined to the opposing surface 3a of the portion 1s, for example. The joining between the portion 1p and the portion 1q, the joining between the portion 1q and the portion 1r, and the joining between the portion 1r and the portion 1s are performed by, for example, an adhesive.

The radiation detector RD1 according to the present modification example includes, for example, light reflecting members 24. The light reflecting members 24 are disposed, for example, between the plurality of portions 1p, 1q, 1r, and 1s. The portion 1p, the portion 1q, the portion 1r, and the portion 1s are joined to each other via the light reflecting members 24, for example. The light reflecting members 24 are disposed at positions that are at least one of a position between the portion 1p and the portion 1q, a position between the portion 1q and the portion 1r, and a position between the portion 1r and the portion 1s. The joining between the portion 1p and the portion 1q, the joining between the portion 1q and the portion 1r, and the joining between the portion 1r and the portion 1s via the corresponding light reflecting member 24 are performed by, for example, an adhesive.

In the present modification example, the portion 1p, the portion 1q, the portion 1r, and the portion 1s may be separately disposed in the first direction D1. When the portion 1p, the portion 1q, the portion 1r, and the portion 1s are individually separated from each other, for example, atmosphere is present between the portion 1p and the portion 1q, between the portion 1q and the portion 1r, and between the portion 1r and the portion 1s. When the portion 1p, the portion 1q, the portion 1r, and the portion 1s are individually separated from each other, the light reflecting member 24 may be provided on at least one of the opposing surfaces 3a and 3b of the portions 1p, 1q, 1r, and 1s. In each of the portions 1p, 1q, 1r, and 1s, the light reflecting members 24 may be disposed on both of the opposing surfaces 3a and 3b. The light reflecting member 24 may be disposed on any one of the opposing surfaces 3a and 3b of each of the portions 1p, 1q, 1r, and 1s. Of the portion 1p, the portion 1q, the portion 1r, and the portion 1s, for example, the portion 1p and the portion 1q may be joined to each other, and the portion 1p and the portion 1q joined to each other may be separated from the portion 1r and the portion 1s.

The light reflecting member 24 includes, for example, metal, a multilayer optical film, or Teflon (registered trademark). The metal of the light reflecting member 24 includes, for example, Al, Ag, or Au. The light reflecting member 24 is formed by, for example, a plating method, a vapor deposition method, or a sputtering method. A thickness of the light reflecting member 24 is, for example, 0.05 to 100 μm. The light reflecting member 24 can transmit radiation incident on the scintillator 1. The material and thickness of the light reflecting member 24 are the same as the material and thickness of the light reflector 48, for example. For example, the light reflecting member 24 is formed by the same method as the light reflector 48, for example. The radiation detector RD1 according to the modification example does not need to include the light reflecting member 24. Even when the radiation detector RD1 according to the modification example does not include the light reflecting member 24, the plurality of portions 1p, 1q, 1r, and 1s are joined to each other.

In the present modification example, when viewed in the second direction D2, each of the plurality of photodetection regions 23a, 23b, 23c, and 23d of the semiconductor substrate 11a has an outline shape corresponding to an outline shape of the coupling surface 3c of the corresponding portion 1p, 1q, 1r, or 1s of the plurality of portions 1p, 1q, 1r, and 1s, the coupling surface 3c opposing the semiconductor substrate 11a. When viewed in the second direction D2, each of the plurality of photodetection regions 23a, 23b, 23c, and 23d of the semiconductor substrate 11b has an outline shape corresponding to an outline shape of the coupling surface 3d of the corresponding portion 1p, 1q, 1r, or 1s of the plurality of portions 1p, 1q, 1r, and 1s, the coupling surface 3d opposing the semiconductor substrate 11b. In the present modification example, the coupling surfaces 3c and 3d of the portions 1p, 1q, 1r, and 1s have a rectangular shape when viewed in the second direction D2. The corresponding photodetection region 23a, 23b, 23c, or 23d have a rectangular outline shape. For example, when the coupling surface 3c constitutes the first coupling surface, the coupling surface 3e constitutes a second coupling surface.

FIG. 12 illustrates paths of scintillation lights incident on the coupling surface 3c. The scintillation lights incident on the coupling surface 3c are generated in the portion 1p. The scintillation lights generated in the portion 1p are confined in the portion 1p, for example. In the present modification example, for example, the light reflecting member 24 is disposed on the opposing surface 3b. The radiation is incident from the opposing surface 3a of the portion 1p. The scintillation lights include, for example, a light L1 and a light L2 incident on the coupling surface 3c from the scintillation light generation point GP1. The light L1 is incident substantially perpendicularly on the coupling surface 3c. A substantially perpendicular incidence angle of the light L1 is smaller than a critical angle on the coupling surface 3c. The light L1 is incident on the coupling surface 3c. The light L1 is detected in the photodetection region 23a of the semiconductor photodetector 10a. The light L2 is incident on the coupling surface 3c at an incidence angle EA1. When the incidence angle EA1 of the light L2 is smaller than the critical angle on the coupling surface 3c, the light L2 is incident on the coupling surface 3c. The light L2 is detected in the photodetection region 23a of the semiconductor photodetector 10a. When the incidence angle EA1 of the light L2 is equal to or larger than the critical angle on the coupling surface 3c, the light L2 is totally reflected from the coupling surface 3c, for example. In the present modification example, since the light reflecting member 24 is disposed, the light L2 totally reflected from the coupling surface 3c tends not to be incident on another portion of the scintillator 1, for example, the portion 1q. The scintillation lights generated in the portion 1p tend not to be detected in the photodetection regions 23b, 23c, and 23d other than the photodetection region 23a.

The scintillation lights include, for example, a light L3 and a light L4 incident on the coupling surface 3d from the scintillation light generation point GP1. The light L1 is incident substantially perpendicularly on the coupling surface 3d. A substantially perpendicular incidence angle of the light L3 is smaller than a critical angle on the coupling surface 3d. The light L3 is incident on the coupling surface 3d. The light L3 is detected in the photodetection region 23a of the semiconductor photodetector 10b. The light L4 is incident on the coupling surface 3d at an incidence angle EA2. When the incidence angle EA2 of the light L4 is smaller than the critical angle on the coupling surface 3d, the light L4 is incident on the coupling surface 3d. The light L4 is detected in the photodetection region 23a of the semiconductor photodetector 10b. When the incidence angle EA2 of the light L4 is equal to or larger than the critical angle on the coupling surface 3d, the light L4 is totally reflected from the coupling surface 3d, for example. In the present modification example, since the light reflecting member 24 is disposed, the light L4 totally reflected from the coupling surface 3*d* tends not to be incident on another portion of the scintillator 1, for example, the portion 1*q*. The scintillation lights generated in the portion 1*p* tend not to be detected in the photodetection regions 23*b*, 23*c*, and 23*d* other than the photodetection region 23*a*. The photodetection region 23*a* detects the scintillation lights generated in the portion 1*p* and reflected from the light reflecting member 24.

In the present modification example, the semiconductor photodetectors 10*a* and 10*b* adhere to the scintillator 1 with adhesives having the same refractive index. Therefore, the critical angles on the coupling surfaces 3*c* and 3*d* are equal to each other. The refractive index of the scintillator 1 is, for example, 1.8. The refractive index of the adhesives is, for example, 1.5. The critical angles of the scintillation lights on the coupling surfaces 3*c* and 3*d* are, for example, about 56.4 degrees. FIG. 12 illustrates the paths of some scintillation lights when the scintillator 1 is viewed in the third direction D3. The semiconductor photodetector 10*a* detects the light L2 in a region R1 in which the incidence angle EA1 of the light L2 the coupling surface 3*c* is smaller than the critical angle on the coupling surface 3*c*. The region R1 expands to, for example, the entire region of the coupling surface 3*c*. The semiconductor photodetector 10*b* detects the light L4 in a region R2 in which the incidence angle EA2 of the light L4 on the coupling surface 3*d* is smaller than the critical angle on the coupling surface 3*d*. The region R2 expands to, for example, the entire region of the coupling surface 3*d*.

In the present modification example, the scintillation lights generated in the portions 1*q*, 1*r*, and 1*s* are incident on the photodetection regions 23*b*, 23*c*, and 23*d*, respectively, and are detected by the semiconductor photodetectors 10*a* and 10*b* disposed on the coupling surfaces 3*c*, 3*d*, respectively. The scintillation lights generated in the portions 1*q*, 1*r*, and 1*s* are confined, for example, in the portions 1*q*, 1*r*, and 1*s*, respectively. In the present modification example, for example, electrical signals output in response to the incidence of the scintillation lights on the photodetection regions 23*a*, 23*b*, 23*c*, and 23*d* are added by a signal processing circuit connected to the wiring members 30*a* and 30*b*.

As illustrated in FIGS. 11 and 12, the radiation detector RD1 includes a light reflector 56 for each of the portions 1*p*, 1*q*, 1*r*, and 1*s*, for example. In the portion 1*p*, for example, the light reflector 56 is disposed on at least one of the opposing surfaces 3*a* and 3*b* and the coupling surfaces 3*e* and 3*f*, for example. In the present modification example, the light reflectors 56 are disposed on the opposing surface 3*a* and the coupling surfaces 3*e* and 3*f*. In the portions 1*q* and 1*r*, for example, the light reflector 56 is disposed on at least one of the coupling surfaces 3*e* and 3*f*, for example. In the present modification example, the light reflectors 56 are disposed on the coupling surfaces 3*e* and 3*f*. In the portion 1*s*, for example, the light reflector 56 is disposed on at least one of the opposing surfaces 3*a* and 3*b* and the coupling surfaces 3*e* and 3*f*, for example. In the present modification example, the light reflectors 56 are disposed on the opposing surface 3*b* and the coupling surfaces 3*e* and 3*f*. The light reflector 56 reflects the scintillation light so that the scintillation light incident on the opposing surface 3*a* and the coupling surfaces 3*e* and 3*f* is not emitted outside the scintillator 1.

A material and a thickness of the light reflector 56 according to the present modification example are, for example, the same as the material and thickness of the light reflector 48. For example, the light reflector 56 according to the present modification example is formed by the same method as the light reflector 48. The materials and the thicknesses of the light reflector 56 and the light reflecting member 24 according to the present modification example and the light reflector 56 and the light reflector 48 according to the first embodiment are the same as each other, for example. The light reflector 56 according to the first embodiment, the light reflector 56 according to the present modification example, the light reflecting member 24, and the light reflector 48 are formed, for example, by the same method. The materials and the thicknesses of the light reflector 56 and the light reflecting member 24 according to the present modification example and the light reflector 56 and the light reflector 48 according to the first embodiment are different from each other, for example. The light reflector 56 according to the first embodiment, the light reflector 56 according to the present modification example, the light reflecting member 24, and the light reflector 48 are formed, for example, by different methods from each other. The light reflectors 56 disposed at the portions 1*p*, 1*q*, 1*r*, and 1*s* may be integrally formed with the adjacent light reflectors 56. The radiation detector RD1 according to the present modification example does not need to include the light reflector 56.

As described above, the radiation detector RD1 includes: the scintillator 1 including a pair of end surfaces 1*a* and 1*b* opposing each other in the first direction D1, and the side surface 1*c* and the side surface 1*d* opposing each other in the second direction D2 intersecting the first direction D1 and coupling the pair of end surfaces 1*a* and 1*b*, the scintillator 1 having the rectangular shape when viewed in the first direction D1; the semiconductor photodetector 10*a* including the semiconductor substrate 11*a* disposed to oppose the side surface 1*c*; the semiconductor photodetector 10*b* including the semiconductor substrate 11*b* disposed to oppose the side surface 1*d*; the wiring member 30*a* electrically connected to the semiconductor photodetector 10*a*; and the wiring member 30*b* electrically connected to the semiconductor photodetector 10*b*. The length of the scintillator 1 in the first direction D1 is longer than the length of the scintillator 1 in the second direction D2 and the length of the scintillator 1 in the third direction D3 parallel to the side surface 1*c*. A length of the side surface 1*c* in the first direction D1 is longer than a width of the side surface 1*c* in the third direction D3. A length of the side surface 1*d* in the first direction D1 is longer than a width of the side surface 1*d* in the third direction D3. The semiconductor substrate 11*a* includes the portion 21*a* covered with the side surface 1*c*, and the portion 22*a* disposed with the portion 21*a* in the first direction D1 and exposed from the side surface 1*c*. The semiconductor substrate 11*b* includes the portion 21*b* covered with the side surface 1*d*, and the portion 22*b* disposed with the portion 21*b* in the first direction D1 and exposed from the side surface 1*d*. Each of the semiconductor photodetector 10*a* and the semiconductor photodetector 10*b* includes the plurality of photodetection regions 23*a*, 23*b*, 23*c*, and 23*d* including at least one avalanche photodiode 12 arranged to operate in Geiger mode, and the at least one quenching resistor 13 electrically connected in series with one of the anode or the cathode of the corresponding avalanche photodiode 12 of the at least one avalanche photodiode 12. The semiconductor photodetector 10*a* includes the plurality of electrodes 17*a*, 17*b*, 17*c*, and 17*d* electrically connected to the at least one quenching resistor 13 included in the semiconductor photodetector 10*a* and included in the corresponding photodetection region 23*a*, 23*b*, 23*c*, or 23*d* of the plurality of photodetection regions 23a, 23b, 23c, and 23d, and the electrode 18 electrically connected to the other of the anode or the cathode of each of the avalanche photodiodes 12 included in the semiconductor photodetector 10a and included in the corresponding photodetection region 23a, 23b, 23c, or 23d of the plurality of photodetection regions 23a, 23b, 23c, and 23d. The semiconductor photodetector 10b includes the plurality of electrodes 17a, 17b, 17c, and 17d electrically connected to the at least one quenching resistor 13 included in the semiconductor photodetector 10b and included in the corresponding photodetection region 23a, 23b, 23c, or 23d of the plurality of photodetection regions 23a, 23b, 23c, and 23d, and the electrode 18 electrically connected to the other of the anode or the cathode of each of the avalanche photodiodes 12 included in the semiconductor photodetector 10b and included in the corresponding photodetection region 23a, 23b, 23c, or 23d of the plurality of photodetection regions 23a, 23b, 23c, and 23d. The plurality of photodetection regions 23a, 23b, 23c, and 23d included in the semiconductor photodetector 10a are disposed in the portion 21a. The plurality of electrodes 17a, 17b, 17c, and 17d and the electrode 18 included in the semiconductor photodetector 10a are disposed in the portion 22a. The plurality of photodetection regions 23a, 23b, 23c, and 23d included in the semiconductor photodetector 10b are disposed in the portion 21b. The plurality of electrodes 17a, 17b, 17c, and 17d and the electrode 18 included in the semiconductor photodetector 10b are disposed in the portion 22b. The wiring member 30a includes a plurality of conductors 31a, 31b, 31c, and 31d electrically connected to the corresponding electrode 17a, 17b, 17c, or 17d of the plurality of electrodes 17a, 17b, 17c, and 17d included in the semiconductor photodetector 10a, and a conductor 32 connected to the electrode 18 included in the semiconductor photodetector 10a. The wiring member 30b includes a plurality of conductors 31a, 31b, 31c, and 31d electrically connected to the corresponding electrode 17a, 17b, 17c, or 17d of the plurality of electrodes 17a, 17b, 17c, and 17d included in the semiconductor photodetector 10b, and a conductor 32 connected to the electrode 18 included in the semiconductor photodetector 10b.

The radiation detector RD1 includes the scintillator 1 elongated in the first direction D1 and includes the semiconductor photodetector 10a disposed on the side surface 1c of the scintillator 1. The radiation detector RD1 includes the semiconductor photodetector 10b disposed on the side surface 1d of the scintillator 1. The semiconductor photodetector 10a detects the scintillation light incident on the side surface 1c on which the semiconductor photodetector 10a is disposed. The semiconductor photodetector 10b detects the scintillation light incident on the side surface 1d on which the semiconductor photodetector 10b is disposed. The length of the scintillator 1 in the second direction D2 is longer than the length of the scintillator 1 in the first direction D1. Therefore, a distance from the scintillation light generation point GP1 to each of the side surface 1c and the side surface 1d is short. An arrival time of the scintillation light to each of the semiconductor photodetectors 10a and 10b is short, and the radiation detector RD1 achieves high time resolution. The radiation detector RD1 includes the semiconductor photodetector 10a and the semiconductor photodetector 10b. Therefore, the radiation detector RD1 achieves high detection sensitivity as compared with a radiation detector including a single semiconductor photodetector disposed on one side surface of a scintillator.

The radiation detector RD1 includes the semiconductor photodetectors 10a and 10b in which the plurality of photodetection regions 23a, 23b, 23c, and 23d are disposed in the first direction D1. For example, a distance between the scintillation light generation point GP1 and the end surface 1a of the scintillator 1 in the first direction D1 is obtained from a position on the photodetection region 23a, 23b, 23c, or 23d where the most scintillation lights are detected, of the plurality of photodetection regions 23a, 23b, 23c, and 23d.

As a result, a magnitude of energy of radiation incident from the end surface 1a of the scintillator 1 is accurately measured. Therefore, the radiation detector RD1 achieves high detection sensitivity.

In the radiation detector RD1, when viewed in the second direction D2, one region formed by the outline of the plurality of photodetection regions 23a, 23b, 23c, and 23d of the semiconductor substrate 11a has an outline shape corresponding to the outline shape of the side surface 1c. When viewed in the second direction D2, one region formed by the outline of the plurality of photodetection regions 23a, 23b, 23c, and 23d included in the semiconductor substrate 11b has an outline shape corresponding to an outline shape of the side surface 1d.

In a configuration in which the one region formed by the outline of the plurality of photodetection regions 23a, 23b, 23c, and 23d included in the semiconductor substrate 11a has the shape corresponding to the outline shape of the side surface 1c, the plurality of photodetection regions 23a, 23b, 23c, and 23d tend not to be disposed at positions on the semiconductor substrate 11a where no scintillation lights can be received. Therefore, increase in dark count and capacitance in the photodetection regions 23a, 23b, 23c, and 23d of the semiconductor substrate 11a is curbed. In a configuration in which the one region formed by the outline of the plurality of photodetection regions 23a, 23b, 23c, and 23d included in the semiconductor substrate 11b has the shape corresponding to the outline shape of the side surface 1d, the plurality of photodetection regions 23a, 23b, 23c, and 23d tend not to be disposed at positions on the semiconductor substrate 11b where no scintillation lights can be received. Therefore, increase in dark count and capacitance in the photodetection regions 23a, 23b, 23c, and 23d of the semiconductor substrate 11b is curbed. These configurations reduce detection errors of scintillation lights. As a result, the radiation detector RD1 reliably improves the time resolution and the detection sensitivity of the semiconductor photodetector 10a and the semiconductor photodetector 10b.

In the radiation detector RD1, the scintillator 1 has the plurality of portions 1p, 1q, 1r, and 1s disposed independently of each other in the first direction D1. Each of the plurality of portions 1p, 1q, 1r, and 1s is positioned corresponding to the corresponding photodetection region 23a, 23b, 23c, or 23d of the plurality of photodetection regions 23a, 23b, 23c, and 23d disposed in each of the semiconductor substrate 11a and the semiconductor substrate 11b. Each of the plurality of portions 1p, 1q, 1r, and 1s includes the pair of opposing surfaces 3a and 3b that oppose each other in the first direction D1 and the coupling surfaces 3c and 3d that oppose the pair of opposing surfaces 3a and 3b. The coupling surface 3c oppose the semiconductor substrate 11a. The coupling surface 3d oppose the semiconductor substrate 11b and oppose the coupling surface 3c in the second direction D2.

In this configuration, the scintillation lights generated in the portions 1p, 1q, 1r, and 1s are confined in the portions 1p, 1q, 1r, and 1s, respectively. The photodetection regions 23a, 23b, 23c, and 23d corresponding to the portion 1p, 1q, 1r, or 1s reliably detect scintillation lights generated in the corresponding portion $1p$, $1q$, $1r$, or $1s$. Therefore, the radiation detector RD1 reliably achieves high detection sensitivity.

In the radiation detector RD1, the plurality of portions $1p$, $1q$, $1r$, and $1s$ are joined to each other.

This configuration improves the physical strength of the scintillator 1. Therefore, the radiation detector RD1 more reliably achieves high detection sensitivity.

The radiation detector RD1 includes the light reflecting members 24. The light reflecting members 24 are disposed between the plurality of portions $1p$, $1q$, $1r$, and $1s$.

In this configuration, a scintillation light generated in each of the portions $1p$, $1q$, $1r$, and $1s$ is reliably confined in the corresponding portion $1p$, $1q$, $1r$, or $1s$. The photodetection regions $23a$, $23b$, $23c$, and $23d$ corresponding to the portion $1p$, $1q$, $1r$, or $1s$ more reliably detect scintillation lights generated in the portions $1p$, $1q$, $1r$, and $1s$.

Therefore, the electrical signal output in response to the incidence of the scintillation light for each of the photodetection regions $23a$, $23b$, $23c$, and $23d$ is processed by the signal processing circuit connected to the wiring members $30a$ and $30b$. Even when the portions $1p$, $1q$, $1r$, and $1s$ are separated from each other and disposed in the first direction D1, the scintillation light generated in the portion $1p$ is not incident on the portion $1q$, for example. In this case, the scintillation lights generated in the portion $1p$ corresponding to the photodetection region $23a$ are detected individually in the photodetection region $23a$. When the scintillation lights generated in the portions $1q$, $1r$, and $1s$ are confined in the portions $1q$, $1r$, and $1s$, respectively, the scintillation lights generated in the portions $1q$, $1r$, and $1s$ are detected individually in the photodetection regions $23b$, $23c$, and $23d$, respectively. Therefore, the radiation detector RD1 still more reliably achieves high detection sensitivity.

In the radiation detector RD1, when viewed in the second direction D2, each of the plurality of photodetection regions $23a$, $23b$, $23c$, and $23d$ included in the semiconductor substrate $11a$ has an outline shape corresponding to an outline shape of the coupling surface $3c$ of a corresponding portion $1p$, $1q$, $1r$, or $1s$ of the plurality of portions $1p$, $1q$, $1r$, and $1s$, the coupling surface $3c$ opposing the semiconductor substrate $11a$. When viewed in the second direction D2, each of the plurality of photodetection regions $23a$, $23b$, $23c$, and $23d$ included in the semiconductor substrate $11b$ has an outline shape corresponding to an outline shape of the coupling surface $3d$ of the corresponding portion $1p$, $1q$, $1r$, or $1s$ of the plurality of portions $1p$, $1q$, $1r$, and $1s$, the coupling surface $3d$ that opposes the semiconductor substrate $11b$.

In a configuration in which each of the plurality of photodetection regions $23a$, $23b$, $23c$, and $23d$ included in the semiconductor substrate $11a$ has the outline shape corresponding to the outline shape of the coupling surface $3c$ of the corresponding portion $1p$, $1q$, $1r$, or $1s$ of the plurality of portions $1p$, $1q$, $1r$, and $1s$, the coupling surface $3c$ opposing the semiconductor substrate $11a$, the plurality of photodetection regions $23a$, $23b$, $23c$, and $23d$ tend not to be disposed at positions on the semiconductor substrate $11a$ where no scintillation lights can be received. In a configuration in which each of the plurality of photodetection regions $23a$, $23b$, $23c$, and $23d$ included in the semiconductor substrate $11b$ has the outline shape corresponding to the outline shape of the coupling surface $3d$ of the corresponding portion $1p$, $1q$, $1r$, or $1s$ of the plurality of portions $1p$, $1q$, $1r$, and $1s$, the coupling surface $3d$ that opposes the semiconductor substrate $11b$, the plurality of photodetection regions $23a$, $23b$, $23c$, and $23d$ tend not to be disposed at positions on the semiconductor substrate $11b$ where no scintillation lights can be received. Therefore, this configuration curbs increase in dark count and capacitance in the plurality of photodetection regions. As a result, this configuration reliably improves the time resolution and the detection sensitivity of the radiation detector RD1.

In the radiation detector RD1, the plurality of photodetection regions $23a$, $23b$, $23c$, and $23d$ include the photodetection regions and the photodetection region $23d$ closer to the portions $22a$ and $22d$ than the photodetection region $23a$. The width of the conductive wire $14a$ electrically connecting the electrode $17a$ corresponding to the photodetection region $23a$ and the photodetection region $23a$ is larger than the width of the conductive wire $14d$ electrically connecting the electrode $17d$ corresponding to the photodetection region $23d$ and the photodetection region $23d$.

In this configuration, an electrical resistance difference between the conductive wire $14a$ electrically connecting the electrode $17a$ corresponding to the photodetection region $23a$ and the photodetection region $23a$ and the conductive wire $14d$ electrically connecting the electrode $17d$ corresponding to the photodetection region $23d$ and the photodetection region $23d$ is reduced. The length of the conductive wire $14a$ electrically connecting the electrode $17a$ corresponding to the photodetection region $23a$ and the photodetection region $23a$ is longer than the length of the conductive wire $14d$ electrically connecting the electrode $17d$ corresponding to the photodetection region $23d$ and the photodetection region $23d$. As the lengths of the conductive wires $14a$ and $14d$ increase, the electrical resistance of the conductive wires $14a$ and $14d$ increases. As the widths of the conductive wires $14a$ and $14d$ increase, the electrical resistance of the conductive wires $14a$ and $14d$ decreases. Therefore, in the configuration in which the width of the long conductive wire $14a$ is larger than the width of the short conductive wire $14d$, an electrical resistance difference between the electrical resistance of the long conductive wire $14a$ and the electrical resistance of the short conductive wire $14d$ is reduced. Therefore, this configuration more reliably improves the time resolution of the radiation detector RD1.

The radiation detector RD1 includes the reinforcement body 45 disposed between the portions $22a$ and $22b$. The reinforcement body 45 covers the portion $22a$ and the portion $22b$, and couples the portion $22a$ and the portion $22b$.

In this configuration, the reinforcement body 45 disposed between the portions $22a$ and $22b$ improves the mechanical strength of the portions $22a$ and $22b$. The wiring members $30a$ and $30b$ positioned in the portion $22a$ and the portion $22b$, respectively, are protected with the reinforcement body 45. The mechanical strength of the portions $22a$ and $22b$ is improved, and the surfaces $11d$ and $11f$ can be polished, for example.

In the radiation detector RD1, the semiconductor substrate $11a$ includes the surface $11c$ opposing the scintillator 1 in the second direction D2 and the surface $11d$ opposing the surface $11c$ in the second direction D2. The semiconductor substrate $11b$ includes the surface $11e$ opposing the scintillator 1 in the second direction D2 and the surface $11f$ opposing the surface $11e$ in the second direction D2. The surface $11d$ and the surface $11f$ include polished surfaces.

In a configuration in which the surface $11d$ includes a polished surface, the semiconductor substrate $11a$ can be thinned by polishing the surface $11d$. In a configuration in which the surface $11f$ includes a polished surface, the semiconductor substrate $11b$ can be thinned by polishing the surface $11f$. A size of the radiation detector RD1 can be reduced in a thickness direction of the semiconductor substrate 11*a*. A size of the radiation detector RD1 can be reduced in a thickness direction of the semiconductor substrate 11*b*.

The radiation detector RD1 includes: the base 40*a* including the surface 40*c* and the surface 40*d* opposing each other in the second direction D2 and be disposed such that the semiconductor substrate 11*a* is positioned between the surface 40*d* and the scintillator 1; the base 40*b* including the surface 40*e* and the surface 40*f* opposing each other in the second direction D2 and be disposed such that the semiconductor substrate 11*b* is positioned between the surface 40*e* and the scintillator 1; the plurality of terminals 41*a*, 41*b*, 41*c*, and 41*d* disposed on the surface 40*c*; the terminal 42 disposed on the surface 40*c*; the plurality of terminals 41*a*, 41*b*, 41*c*, and 41*d* disposed on the surface 40*e*; the terminal 42 disposed on the surface 40*e*; the wire 43 electrically connecting each of the plurality of terminals 41*a*, 41*b*, 41*c*, and 41*d* disposed on the surface 40*c* and each of the electrodes 17*a*, 17*b*, 17*c*, and 17*d* disposed in the portion 22*a*; the wire 44 electrically connecting the terminal 42 disposed on the surface 40*c* and the electrode 18 disposed in the portion 22*a*; the wire 43 electrically connecting each of the plurality of terminals 41*a*, 41*b*, 41*c*, and 41*d* disposed on the surface 40*e* and each of the electrodes 17*a*, 17*b*, 17*c*, and 17*d* disposed in the portion 22*b*; and the wire 44 electrically connecting the terminal 42 disposed on the surface 40*e* and the electrode 18 disposed in the portion 22*b*. The base 40*a* includes the portion 51*a* covered with the semiconductor substrate 11*a*, and the portion 52*a* disposed with the portion 51*a* in the first direction D1 and exposed from the semiconductor substrate 11*a*. The base 40*b* includes the portion 51*b* covered with the semiconductor substrate 11*b*, and the portion 52*b* disposed with the portion 51*b* in the first direction D1 and exposed from the semiconductor substrate 11*b*. The terminals 41*a*, 41*b*, 41*c*, and 41*d* and the terminal 42 disposed on the surface 40*c* are positioned on the portion 52*a*. The terminals 41*a*, 41*b*, 41*c*, and 41*d* and the terminal 42 disposed on the surface 40*e* are positioned on the portion 52*b*.

A configuration in which the bases 40*a* and 40*b* are provided improves the mechanical strength of the radiation detector RD1. Therefore, this configuration reliably realizes the radiation detector RD1 having high mechanical strength.

The radiation detector RD1 includes the cover body 47*a* disposed such that the semiconductor substrate 11*a* is positioned between the cover body 47*a* and the scintillator 1, and the cover body 47*b* disposed such that the semiconductor substrate 11*b* is positioned between the cover body 47*b* and the scintillator 1. Each of the cover body 47*a* and the cover body 47*b* includes at least one of the light reflector 48 and the electrical insulator 49.

For example, a configuration in which each of the cover body 47*a* and the cover body 47*b* includes the light reflector 48 improves light reflection characteristics of the scintillation light. For example, a configuration in which each of the cover body 47*a* and the cover body 47*b* includes the electrical insulator 49 improves electrical insulation between the radiation detectors RD1 adjacent to each other.

In the radiation detector RD1, the wiring member 30*a* is disposed on the same side as the scintillator 1 relative to the semiconductor substrate 11*a*. The wiring member 30*b* is disposed on the same side as the scintillator 1 relative to the semiconductor substrate 11*b*.

In a configuration in which the wiring member 30*a* is disposed on the same side as the scintillator 1 relative to the semiconductor substrate 11*a*, there is no need to provide a substrate for connecting the wiring member 30*a* to the electrodes 17*a*, 17*b*, 17*c*, and 17*d* and the electrode 18 included in the semiconductor photodetector 10*a* through die bonding, for example. In a configuration in which the wiring member 30*b* is disposed on the same side as the scintillator 1 relative to the semiconductor substrate 11*b*, there is no need to provide a substrate for connecting the wiring member 30*b* to the electrodes 17*a*, 17*b*, 17*c*, and 17*d* and the electrode 18 included in the semiconductor photodetector 10*b* through die bonding, for example. Therefore, this configuration more reliably simplifies the configuration of the radiation detector RD1.

In the radiation detector RD1, at least a part of the wiring member 30*a* and the scintillator 1 are disposed in front of the same surface of the semiconductor substrate 11*a*. That is, at least a part of the wiring member 30*b* and the scintillator 1 are disposed in front of the same surface of the semiconductor substrate 11*b*, for example.

In the configuration in which at least a part of the wiring member 30*a* and the scintillator 1 are disposed in front of the same surface of the semiconductor substrate 11*a*, the space efficiency of the radiation detector RD1 is improved as compared with a configuration in which at least a part of the wiring member 30*a* and the scintillator 1 are disposed in front of corresponding different surfaces of the semiconductor substrates 11*a*. In the configuration in which at least a part of the wiring member 30*b* and the scintillator 1 are disposed in front of the same surface of the semiconductor substrate 11*b*, the space efficiency of the radiation detector RD1 is improved as compared with a configuration in which at least a part of the wiring member 30*b* and the scintillator 1 are disposed in front of corresponding different surfaces of the semiconductor substrates 11*b*.

In the radiation detector RD1, at least a part of the wiring member 30*a* and the scintillator 1 are disposed in front of the same surface of the base 40*a*. At least a part of the wiring member 30*b* and the scintillator 1 are disposed in front of the same surface of the base 40*b*, for example.

In the configuration in which at least a part of the wiring member 30*a* and the scintillator 1 are disposed in front of the same surface of the base 40*a*, the wiring member 30*a* is easily connected to the electrodes 17*a*, 17*b*, 17*c*, 17*d*, and 18 included in the semiconductor photodetector 10*a* through die bonding. In the configuration in which at least a part of the wiring member 30*b* and the scintillator 1 are disposed in front of the same surface of the base 40*b*, the wiring member 30*b* is easily connected to the electrodes 17*a*, 17*b*, 17*c*, 17*d*, and 18 included in the semiconductor photodetector 10*b* through die bonding.

In the radiation detector RD1, the wiring member 30*a* and the wiring member 30*b* and the semiconductor substrate 11*a* and the semiconductor substrate 11*b* have flexibility. The flexibility of the wiring member 30*a* is higher than the flexibility of the semiconductor substrate 11*a*. The flexibility of the wiring member 30*b* is higher than the flexibility of the semiconductor substrate 11*b*.

In a configuration in which the flexibility of the wiring member 30*a* is higher than the flexibility of the semiconductor substrate 11*a*, vibration of the wiring member 30*a* tends not to be transmitted to the semiconductor substrate 11*a*. The force from the wiring member 30*a* tends not to be applied to the semiconductor substrate 11*a*, and the semiconductor substrate 11*a* tends not to be physically damaged. In a configuration in which the flexibility of the wiring member 30*b* is higher than the flexibility of the semiconductor substrate 11*b*, vibration of the wiring member 30*b* tends not to be transmitted to the semiconductor substrate 11b. The force from the wiring member 30b tends not to be applied to the semiconductor substrate 11b, and the semiconductor substrate 11b tends not to be physically damaged. Therefore, this configuration reliably maintains the mechanical strength of the radiation detector RD1.

Second Embodiment

Figure 13:
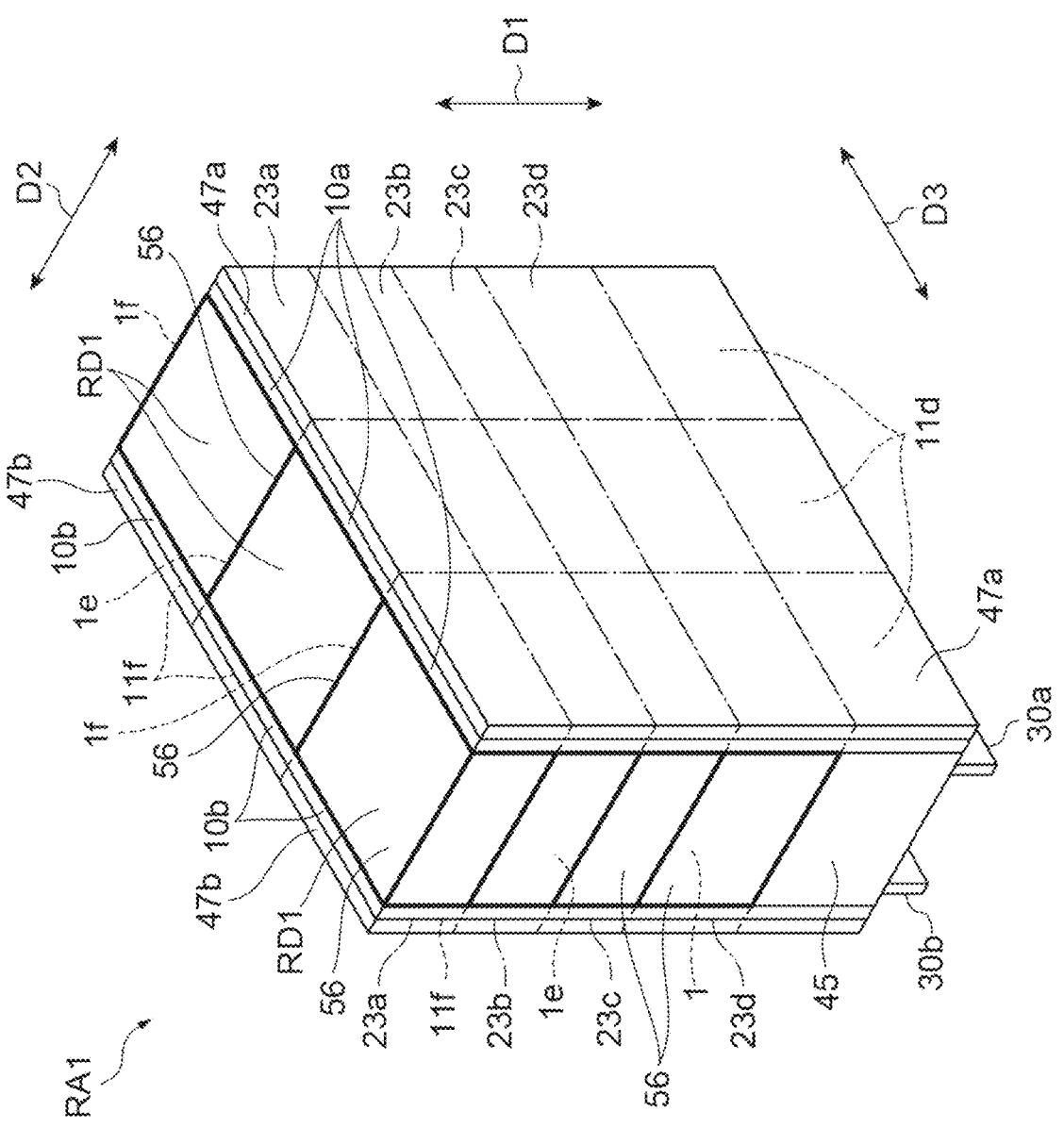
FIG. 13 is a perspective view illustrating a radiation detector array according to a second embodiment.
Figure 14:
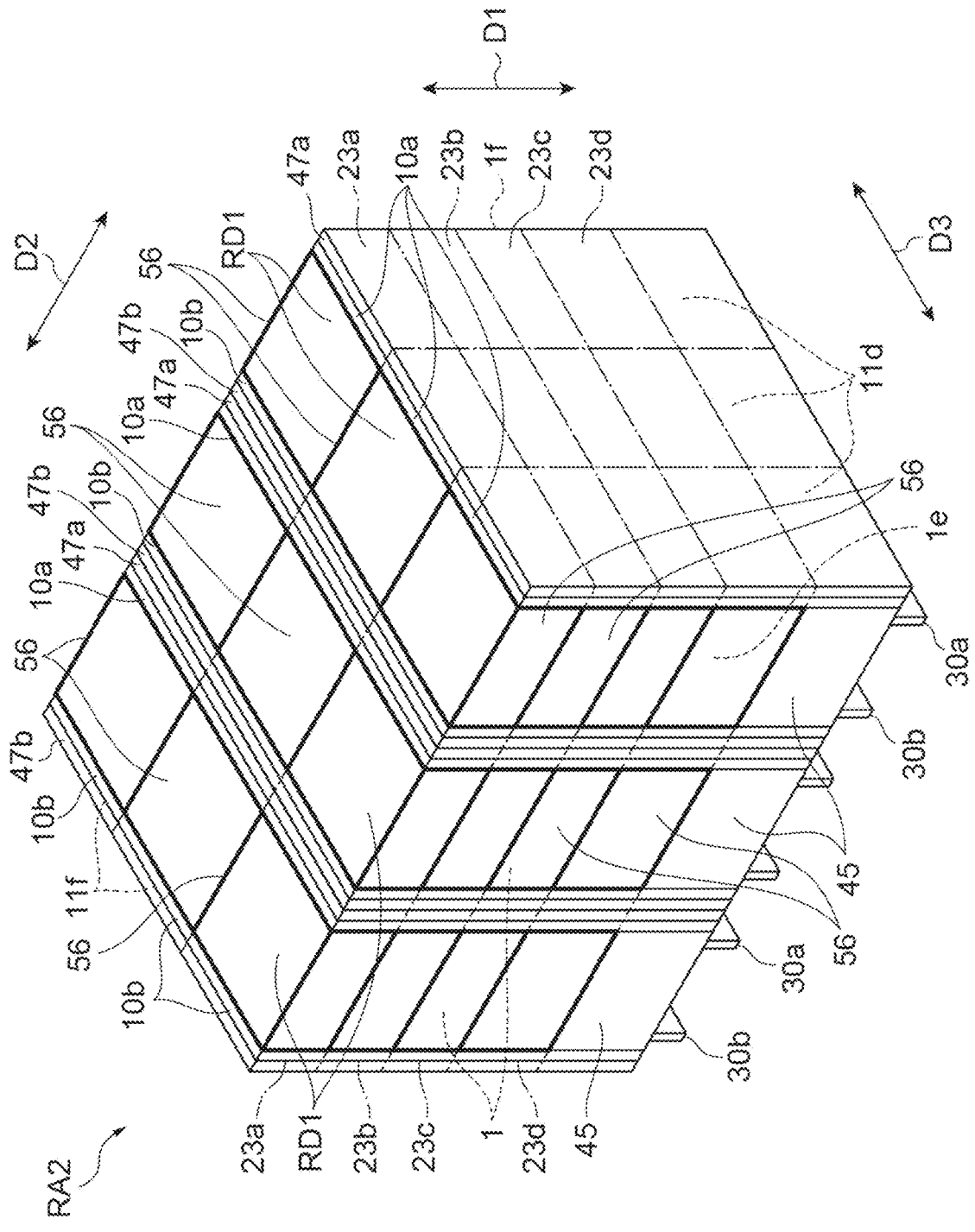
FIG. 14 is a perspective view illustrating the radiation detector array according to the second embodiment.

Configurations of radiation detector arrays RA1 and RA2 according to a second embodiment will be described with reference to FIGS. 13 and 14. FIG. 13 is a perspective view illustrating the radiation detector array RA1 according to the second embodiment. FIG. 14 is a perspective view illustrating the radiation detector array RA2 according to the second embodiment.

As illustrated in FIG. 13, the radiation detector array RA1 has a configuration in which a plurality of radiation detectors RD1 according to the first embodiment or the modification example are disposed one-dimensionally, for example. The plurality of radiation detectors RD1 are disposed in the third direction D3, for example. In an example illustrated in FIG. 13, three radiation detectors RD1 are disposed in the third direction D3. Of the plurality of radiation detectors RD1, any two radiation detectors RD1 adjacent to each other are disposed such that the side surfaces 1e and 1f of the scintillator 1 included in one radiation detector RD1 and the side surfaces 1e and 1f of the scintillator 1 included in the other radiation detector RD1 oppose each other. Therefore, any two radiation detectors RD1 adjacent to each other in the third direction D3 are disposed such that the side surface 1e of the scintillator 1 included in one radiation detector RD1 and the side surface 1f of the scintillator 1 included in the other radiation detector RD1 oppose each other. Any two radiation detectors RD1 adjacent to each other in the third direction D3 are disposed such that the side surface 1f of the scintillator 1 included in one radiation detector RD1 and the side surface 1e of the scintillator 1 included in the other radiation detector RD1 oppose each other.

The semiconductor photodetector 10a included in the one radiation detector RD1 and the semiconductor photodetector 10a included in the other radiation detector RD1 are one-dimensionally disposed, for example. In the present embodiment, the semiconductor photodetector 10a included in the one radiation detector RD1 and the semiconductor photodetector 10a included in the other radiation detector RD1 are disposed in the third direction D3, for example. The semiconductor photodetector 10b included in the one radiation detector RD1 and the semiconductor photodetector 10b included in the other radiation detector RD1 are one-dimensionally disposed, for example. In the present embodiment, the semiconductor photodetector 10b included in the one radiation detector RD1 and the semiconductor photodetector 10b included in the other radiation detector RD1 are disposed in the third direction D3, for example.

The semiconductor photodetector 10a included in the one radiation detector RD1 and the semiconductor photodetector 10a included in the other radiation detector RD1 are one-dimensionally disposed, and are integrally formed to each other, for example. That is, the semiconductor photodetectors 10a included in the plurality of radiation detectors RD1 are integrally formed. The semiconductor photodetectors 10a are disposed in the third direction D3, for example. The semiconductor photodetector 10b included in the one radiation detector RD1 and the semiconductor photodetector 10b included in the other radiation detector RD1 are one-dimensionally disposed, and are integrally formed to each other, for example. That is, the semiconductor photodetectors 10b included in the plurality of radiation detectors RD1 are integrally formed. The semiconductor photodetectors 10b are disposed, for example, in the third direction D3, for example. That is, the semiconductor photodetectors 10a included in the plurality of radiation detectors RD1 does not need to be integrally formed. That is, the semiconductor photodetectors 10b included in the plurality of radiation detectors RD1 does not need to be integrally formed.

Each of the radiation detectors RD1 includes, for example, the cover bodies 47a and 47b and the light reflector 56. When each of the radiation detectors RD1 includes the light reflector 56, the side surface 1e of the scintillator 1 included in the one radiation detector RD1 and the side surface 1f of the scintillator 1 included in the other radiation detector RD1 oppose each other in the third direction D3 such that the light reflector 56 is positioned between the side surface 1e and the side surface 1f. Therefore, for example, the light reflector 56 disposed on the side surface 1e of the scintillator 1 included in one radiation detector RD1 and the light reflector 56 disposed on the side surface 1f of the scintillator 1 included in the other radiation detector RD1 are disposed between the side surface 1e in the one radiation detector RD1 and the side surface 1f in the other radiation detector RD1. In the present embodiment, for example, one light reflector 56 may be disposed between the side surface 1e of the scintillator 1 included in one radiation detector RD1 and the side surface 1f of the scintillator 1 included in the other radiation detector RD1. In the configuration in which one light reflector 56 is disposed, for example, the light reflector 56 is disposed on the side surface 1e in the one radiation detector RD1, and the light reflector 56 is not disposed on the side surface 1f in the other radiation detector RD1. Each of the radiation detectors RD1 does not need to include at least one of the cover bodies 47a and 47b and the light reflector 56.

As illustrated in FIG. 14, the radiation detector array RA2 has a configuration in which a plurality of radiation detectors RD1 according to the first embodiment or the modification example are two-dimensionally disposed in the matrix, for example. Of the plurality of radiation detectors RD1, the plurality of radiation detectors RD1 disposed in a row direction constitute, for example, the radiation detector array RA1 illustrated in FIG. 13. In the radiation detector array RA2, for example, the radiation detector arrays RA1 are disposed in a column direction. In the present embodiment, the column direction is the second direction D2, and the row direction is the third direction D3. Of the plurality of radiation detectors RD1, any two radiation detectors RD1 adjacent to each other in the column direction are disposed such that either the semiconductor photodetector 10a or the semiconductor photodetector 10b included in one radiation detector RD1 and either the semiconductor photodetector 10a or the semiconductor photodetector 10b included in the other radiation detector RD1 oppose each other in the column direction. Therefore, any two radiation detectors RD1 adjacent to each other in the column direction are disposed such that, for example, the semiconductor photodetector 10a included in the one radiation detector RD1 and the semiconductor photodetector 10a included in the other radiation detector RD1 oppose each other in the column direction. Any two radiation detectors RD1 adjacent to each other in the column direction are disposed such that, for example, the semiconductor photodetector 10a included in the one radiation detector RD1 and the semiconductor photodetector 10b included in the other radiation detector RD1 oppose each other in the column direction. Any two radiation detectors RD1 adjacent to each other are disposed such that, for example, the semiconductor photodetector 10*b* included in the one radiation detector RD1 and the semiconductor photodetector 10*a* included in the other radiation detector RD1 oppose each other in the column direction. Any two radiation detectors RD1 adjacent to each other in the column direction are disposed such that, for example, the semiconductor photodetector 10*b* included in the one radiation detector RD1 and the semiconductor photodetector 10*b* included in the other radiation detector RD1 oppose each other in the column direction.

When each of the radiation detectors RD1 includes the cover bodies 47*a* and 47*b*, in any two radiation detectors RD1 adjacent to each other in the column direction, for example, the semiconductor photodetector 10*a* included in one radiation detector RD1 and the semiconductor photodetector 10*b* included in the other radiation detector RD1 oppose each other in the column direction such that the cover bodies 47*a* and 47*b* are positioned between the semiconductor photodetectors 10*a* and 10*b*. In any two radiation detectors RD1 adjacent to each other in the column direction, for example, the semiconductor photodetector 10*b* included in one radiation detector RD1 and the semiconductor photodetector 10*a* included in the other radiation detector RD1 oppose each other in the column direction such that the cover bodies 47*b* and 47*a* are positioned between the semiconductor photodetectors 10*b* and 10*a*. In the example illustrated in FIG. 14, three radiation detectors RD1 are disposed in the third direction D3, and three radiation detectors RD1 are disposed in the second direction D2. The radiation detector array RA2 includes, for example, a total of nine radiation detectors RD1. For example, the end surface 1*a* of one radiation detector RD1 is flush with the end surface 1*a* of another radiation detector RD1 adjacent thereto in the row direction or the column direction.

As described above, the radiation detector array RA1 according to the present embodiment includes the plurality of radiation detectors RD1 disposed one-dimensionally. Each of the plurality of radiation detectors RD1 is the radiation detector RD1 according to the first embodiment or the modification example. The scintillator 1 includes the pair of side surfaces 1*e* and 1*f* that couples the pair of end surfaces 1*a* and 1*b* and couples the side surface 1*c* and the side surface 1*d*. Of the plurality of radiation detectors RD1, any two radiation detectors RD1 adjacent to each other are disposed such that the side surfaces 1*e* and 1*f* of the scintillator 1 included in one radiation detector RD1 and the side surfaces 1*e* and 1*f* of the scintillator 1 included in the other radiation detector RD1 oppose each other.

The radiation detector array RA1 according to the present embodiment realizes the radiation detector array in which the radiation detectors RD1 having high time resolution and high detection sensitivity are one-dimensionally disposed.

In the radiation detector array RA1, the semiconductor photodetectors 10*a* included in the plurality of radiation detectors RD1 are integrally formed. The semiconductor photodetectors 10*b* included in the plurality of radiation detectors RD1 are integrally formed.

A configuration in which the semiconductor photodetectors 10*a* are integrally formed and the semiconductor photodetectors 10*b* are integrally formed improves mechanical strength of the radiation detector array RA1 in which the plurality of radiation detectors RD1 are one-dimensionally disposed.

The radiation detector array RA2 according to the present embodiment includes the plurality of radiation detectors RD1 disposed two-dimensionally in the matrix. Of the plurality of radiation detectors RD1, the plurality of radiation detectors RD1 disposed in the row direction constitute, for example, the radiation detector array RA1 according to the present embodiment or the modification example. Of the plurality of radiation detectors RD1, any two radiation detectors RD1 adjacent to each other in the column direction are disposed such that either the semiconductor photodetector 10*a* or the semiconductor photodetector 10*b* included in one radiation detector RD1 and either the semiconductor photodetector 10*a* or the semiconductor photodetector 10*b* included in the other radiation detector RD1 oppose each other in the column direction.

A configuration in which the plurality of radiation detectors RD1 are two-dimensionally disposed in the matrix realizes the radiation detector array RA2 in which the radiation detectors RD1 having high time resolution and high detection sensitivity are two-dimensionally disposed in the matrix. In the present embodiment, when the radiation detectors RD1 include the light reflector 56, the scintillation light incident on the side surface 1*e* of the scintillator 1 included in one radiation detector RD1 tends not to be incident on the side surface 1*f* of the scintillator 1 included in another radiation detector RD1, for example.

Third Embodiment

Figure 15:
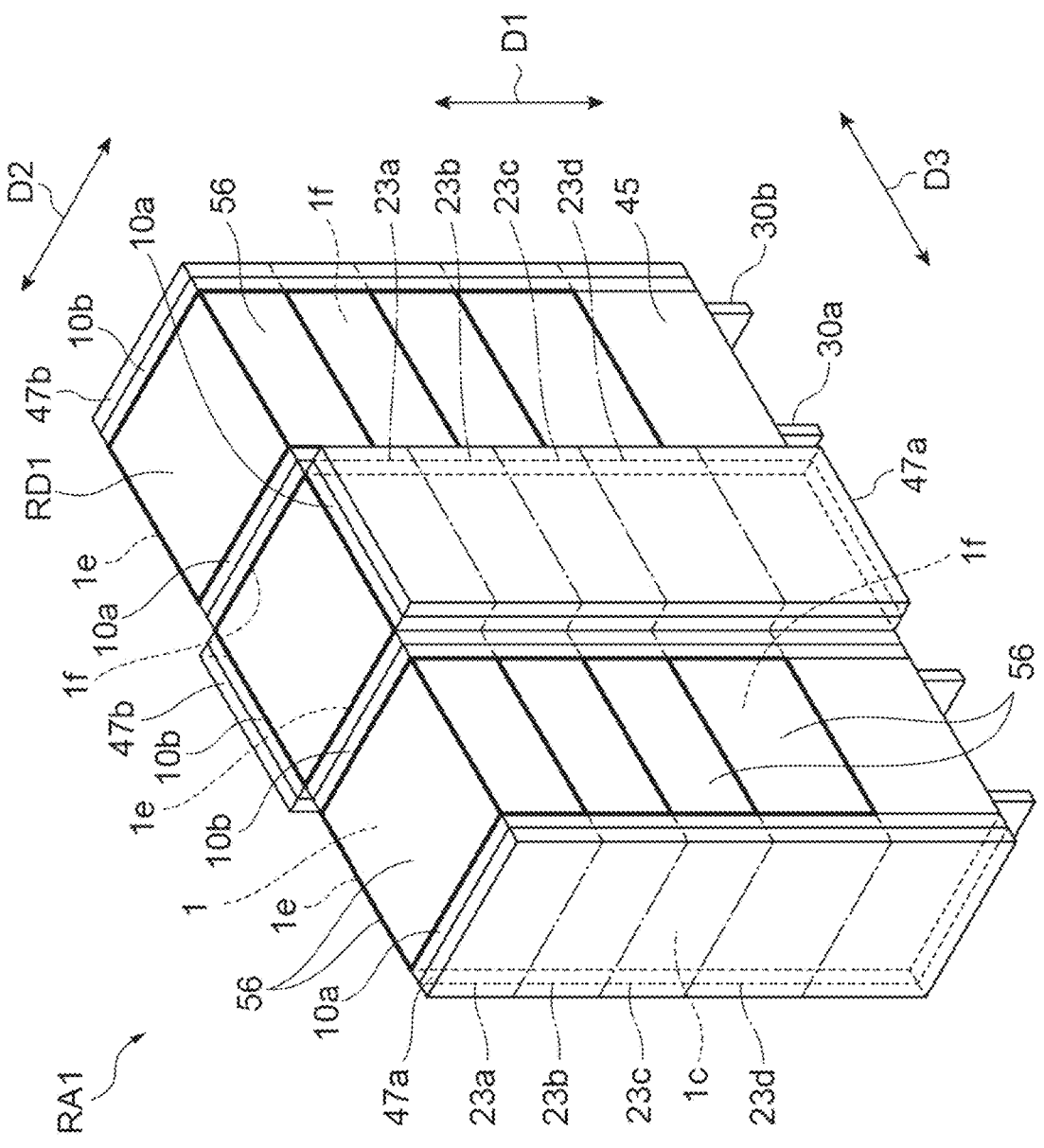
FIG. 15 is a perspective view illustrating a radiation detector array according to a third embodiment.
Figure 16:
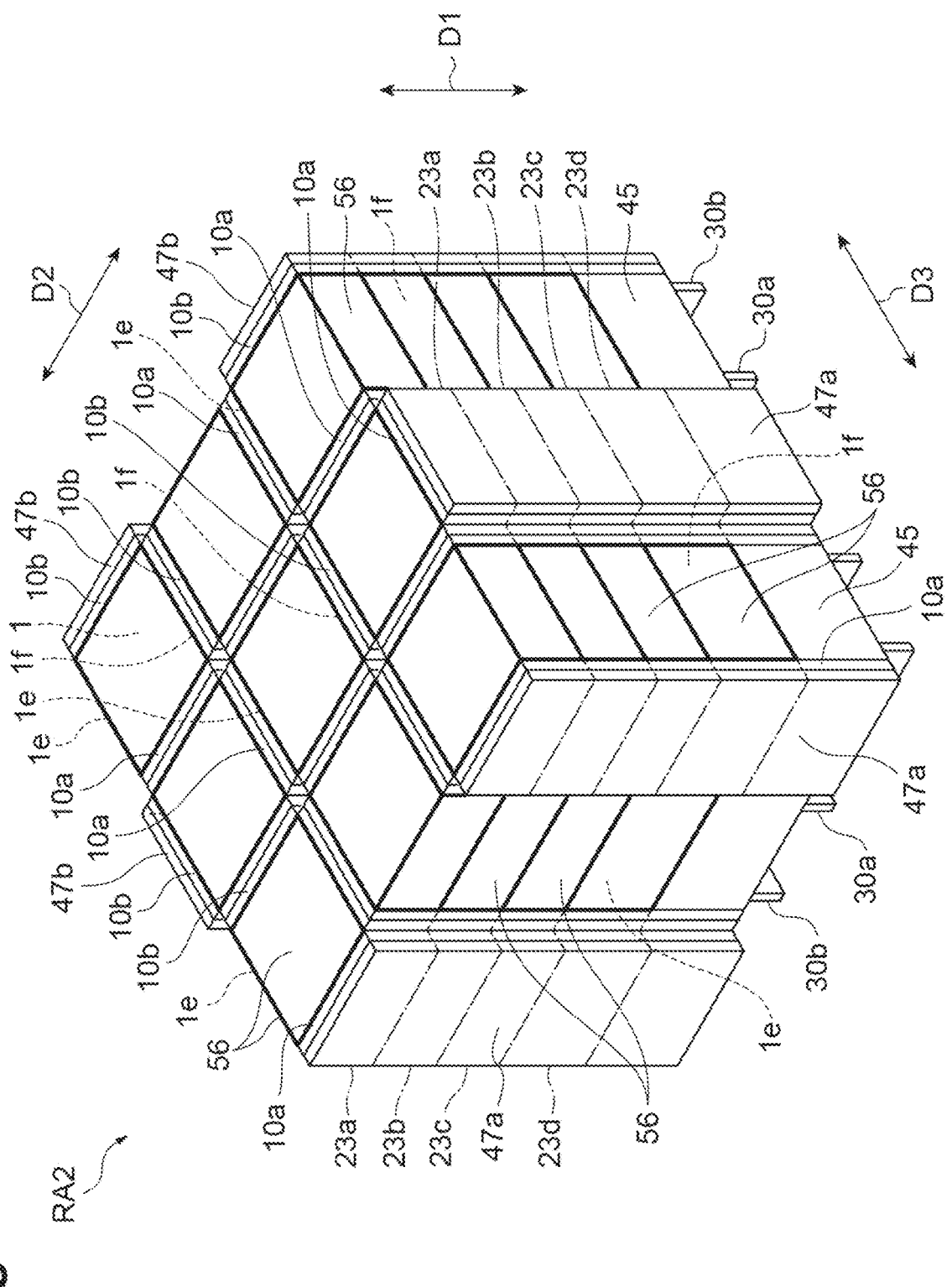
FIG. 16 is a perspective view illustrating the radiation detector array according to the third embodiment.

Configurations of radiation detector arrays RA1 and RA2 according to a third embodiment will be described with reference to FIGS. 15 and 16. FIG. 15 is a perspective view illustrating the radiation detector array RA1 according to the third embodiment. FIG. 16 is a perspective view illustrating the radiation detector array RA2 according to the third embodiment.

As illustrated in FIG. 15, the radiation detector array RA1 has a configuration in which the plurality of radiation detectors RD1 according to the first embodiment or the modification example are disposed one-dimensionally, for example. The plurality of radiation detectors RD1 are disposed in the third direction D3, for example. In an example illustrated in FIG. 15, three radiation detectors RD1 of the first embodiment are disposed in the third direction D3. Of the plurality of radiation detectors RD1, any two radiation detectors RD1 adjacent to each other are disposed such that the side surfaces 1*e* and 1*f* of the scintillator 1 included in one radiation detector RD1 and either the semiconductor photodetector 10*a* or the semiconductor photodetector 10*b* included in the other radiation detector RD1 oppose each other. Therefore, any two radiation detectors RD1 adjacent to each other in the third direction D3 are disposed such that the side surface 1*e* of the scintillator 1 included in one radiation detector RD1 and the semiconductor photodetector 10*b* included in the other radiation detector RD1 oppose each other in the third direction D3. Any two radiation detectors RD1 adjacent to each other in the third direction D3 are disposed such that the side surface 1*f* of the scintillator 1 included in one radiation detector RD1 and the semiconductor photodetector 10*a* included in the other radiation detector RD1 oppose each other in the third direction D3.

Each of the radiation detectors RD1 includes, for example, the cover bodies 47*a* and 47*b* and the light reflector 56. In this case, for example, in any two radiation detectors RD1 adjacent to each other in the third direction D3, the side surface 1*e* of the scintillator 1 included in one radiation detector RD1 and the semiconductor photodetector 10*b* included in the other radiation detector RD1 oppose each other in the third direction D3 such that the cover body 47*b* and the light reflector 56 are positioned between the side surface 1e and the semiconductor photodetector 10b. For example, in any two radiation detectors RD1 adjacent to each other in the third direction D3, the side surface 1f of the scintillator 1 included in one radiation detector RD1 and the semiconductor photodetector 10a included in the other radiation detector RD1 oppose each other in the third direction D3 such that the cover body 47a and the light reflector 56 are positioned between the side surface 1f and the semiconductor photodetector 10a. Each of the radiation detectors RD1 does not need to include at least one of the cover bodies 47a and 47b and the light reflector 56.

As illustrated in FIG. 16, the radiation detector array RA2 has a configuration in which the plurality of radiation detectors RD1 according to the first embodiment or the modification example are two-dimensionally disposed in the matrix, for example. Of the plurality of radiation detectors RD1, the plurality of radiation detectors RD1 disposed in the row direction all constitute, for example, the radiation detector array RA1 illustrated in FIG. 15. Therefore, in the radiation detector array RA2, the radiation detector arrays RA1 are disposed in the column direction. In the present embodiment, the column direction is the second direction D2, and the row direction is the third direction D3. Of the plurality of radiation detectors RD1, any two radiation detectors RD1 adjacent to each other in the column direction are disposed such that the side surfaces 1e and 1f of the scintillator 1 included in one radiation detector RD1 and either the semiconductor photodetector 10a or the semiconductor photodetector 10b included in the other radiation detector RD1 oppose each other in the column direction. An opposing direction of the side surfaces 1e and 1f of the scintillator 1 included in the one radiation detector RD1 and an opposing direction of the side surfaces 1e and 1f of the scintillator 1 included in the other radiation detector RD1 intersect each other, for example. Therefore, any two radiation detectors RD1 adjacent to each other in the column direction are disposed such that, for example, the side surface 1e of the scintillator 1 included in one radiation detector RD1 and the semiconductor photodetector 10a included in the other radiation detector RD1 oppose each other in the column direction. Any two radiation detectors RD1 adjacent to each other in the column direction are disposed such that, for example, the side surface 1f of the scintillator 1 included in one radiation detector RD1 and the semiconductor photodetector 10b included in the other radiation detector RD1 oppose each other in the column direction.

In the example illustrated in FIG. 16, three radiation detectors RD1 are disposed in the third direction D3, and three radiation detectors RD1 are disposed in the second direction D2. The radiation detector array RA2 includes, for example, a total of nine radiation detectors RD1. For example, the end surface 1a of one radiation detector RD1 is flush with the end surface 1a of another radiation detector RD1 adjacent thereto in the row direction or the column direction.

In the configuration in which each of the radiation detectors RD1 includes the cover bodies 47a and 47b and the light reflector 56, for example, the side surface 1e of the scintillator 1 included in one radiation detector RD1 and the semiconductor photodetector 10a included in another radiation detector RD1 oppose each other in the column direction such that the cover body 47a and the light reflector 56 are positioned between the side surface 1e and the semiconductor photodetector 10a. For example, the side surface 1f of the scintillator 1 included in one radiation detector RD1 and the semiconductor photodetector 10b included in another radiation detector RD1 oppose each other in the column direction such that the cover body 47b and the light reflector 56 are positioned between the side surface 1f and the semiconductor photodetector 10b.

As described above, the radiation detector array RA1 according to the present embodiment includes the plurality of radiation detectors RD1 disposed one-dimensionally. Each of the plurality of radiation detectors RD1 is the radiation detector RD1 according to the first embodiment or the modification example. The scintillator 1 includes the pair of side surfaces 1e and 1f that couples the pair of end surfaces 1a and 1b and couples the side surface 1c and the side surface 1d. Of the plurality of radiation detectors RD1, any two radiation detectors RD1 adjacent to each other are disposed such that the side surfaces 1e and 1f of the scintillator 1 included in one radiation detector RD1 and either the semiconductor photodetector 10a or the semiconductor photodetector 10b included in the other radiation detector RD1 oppose each other.

The radiation detector array RA1 according to the present embodiment realizes the radiation detector array in which the radiation detectors RD1 having high time resolution and high detection sensitivity are one-dimensionally disposed.

The radiation detector array RA2 according to the present embodiment includes the plurality of radiation detectors RD1 disposed two-dimensionally in the matrix. Of the plurality of radiation detectors RD1, the plurality of radiation detectors RD1 disposed in the row direction constitute, for example, the radiation detector array RA1 according to the present embodiment. Of the plurality of radiation detectors RD1, any two radiation detectors RD1 adjacent to each other in the column direction are disposed such that the side surfaces 1e and 1f of the scintillator 1 included in one radiation detector RD1 and either the semiconductor photodetector 10a or the semiconductor photodetector 10b included in the other radiation detector RD1 oppose each other in the column direction.

The configuration in which the plurality of radiation detectors RD1 are two-dimensionally disposed in the matrix realizes the radiation detector array RA2 in which the radiation detectors RD1 having high time resolution and high detection sensitivity are two-dimensionally disposed in the matrix. In a configuration in which the side surfaces 1e and 1f and either the semiconductor photodetector 10a or the semiconductor photodetector 10b included in the other radiation detector RD1 oppose each other in the column direction, the plurality of radiation detectors RD1 are two-dimensionally disposed in a smaller space as compared with a configuration in which the semiconductor photodetector 10a and the semiconductor photodetector 10b oppose each other.

In the present embodiment, for example, the scintillation light incident on the side surface 1e of the scintillator 1 included in one radiation detector RD1 tends not to be incident on the scintillator 1 included in another radiation detector RD1, compared with a configuration in which the side surface 1e of the scintillator 1 included in the one radiation detector RD1 and the side surface 1f of the scintillator 1 included in the other radiation detector RD1 oppose each other. In the present embodiment, for example, the scintillation light incident on the side surface 1f of the scintillator 1 included in one radiation detector RD1 tends not to be incident on the scintillator 1 included in another radiation detector RD1, compared with a configuration in which the side surface 1f of the scintillator 1 included in the one radiation detector RD1 and the side surface 1e of the scintillator 1 included in the other radiation detector RD1 oppose each other.

Figure 17:
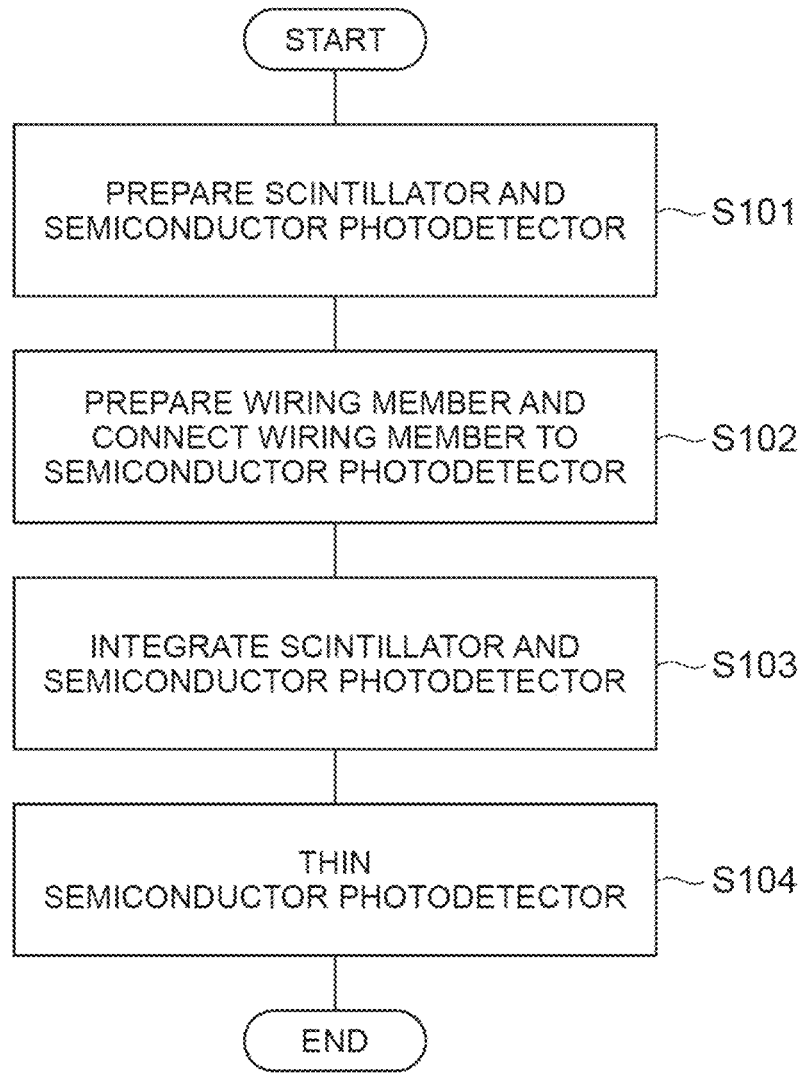
FIG. 17 is a flowchart illustrating a method for producing a radiation detector.

An example of a method for producing the radiation detector RD1 will be described with reference to FIG. 17. Serial orders of steps of the producing method may be interchanged with each other. In an example of the producing method, first, the scintillator 1 and the semiconductor photodetectors 10a and 10b are prepared (S101).

Subsequently, the wiring members 30a and 30b are prepared and connected to the semiconductor photodetectors 10a and 10b (S102). For example, the wiring member 30a is connected to the semiconductor photodetector 10a, and the wiring member 30b is connected to the semiconductor photodetector 10b. The wiring members 30a and 30b each include a conductor 31 and a conductor 32. The conductor 31 included in the wiring member 30a is electrically connected to the electrodes 17a, 17b, 17c, and 17d of the semiconductor photodetector 10a. The conductor 31 of the wiring member 30b is electrically connected to the electrodes 17a, 17b, 17c, and 17d included in the semiconductor photodetector 10b. The conductor 32 included in the wiring member 30a is electrically connected to the electrode 18 included in the semiconductor photodetector 10a. The conductor 32 included in the wiring member 30b is electrically connected to the electrode 18 included in the semiconductor photodetector 10b. The conductors 31a, 31b, 31c, and 31d included in the wiring member 30a are electrically connected to the electrodes 17a, 17b, 17c, and 17d, respectively, included in the semiconductor photodetector 10a via the corresponding conductive bump 33, for example. The conductors 31a, 31b, 31c, and 31d included in the wiring member 30b are electrically connected to the electrodes 17a, 17b, 17c, and 17d, respectively, included in the semiconductor photodetector 10b via the corresponding conductive bump 33, for example. The conductor 32 included in the wiring member 30a is connected to the electrode 18 included in the semiconductor photodetector 10a via the conductive bump 33, for example. The conductor 32 included in the wiring member 30b is connected to the electrode 18 included in the semiconductor photodetector 10b via the conductive bump 33, for example.

Subsequently, the scintillator 1 and the semiconductor photodetectors 10a and 10b are integral to each other (S103). This integration is achieved, for example, with an adhesive. The semiconductor photodetector 10a is disposed, for example, on the side surface 1c of the scintillator 1. The semiconductor photodetector 10b is disposed, for example, on the side surface 1d of the scintillator 1. Subsequently, the reinforcement body 45 is disposed between the portions 22a and 22b.

Subsequently, the semiconductor photodetectors 10a and 10b are thinned (S104). An element is thinned by, for example, polishing the surfaces 11d and 11f. The polishing of the surfaces 11d and 11f is performed by, for example, mechanical polishing or chemical polishing. The semiconductor photodetectors 10a and 10b are thinned in, for example, the radiation detector array RA1 in which the plurality of radiation detectors RD1 are disposed one-dimensionally. That is, the semiconductor photodetectors 10a and 10b included in the radiation detector array RA1 are thinned. The plurality of thinned radiation detector arrays RA1 are, for example, are individually divided to produce individual radiation detectors RD1. The individual dividing is performed by, for example, dicing. The plurality of thinned radiation detector arrays RA1 may be disposed, for example, to be disposed in the column direction without being individually divided. The radiation detector array RA2 in which the plurality of radiation detector arrays RA1 are two-dimensionally disposed in the matrix may be produced.

The present embodiment includes a method for producing a radiation detector. The method for producing the radiation detector is as follows.

(Producing Method 1)

A method for producing a radiation detector including:

preparing a scintillator;

preparing a semiconductor photodetector;

integrating the scintillator and the semiconductor photodetector; and thinning the semiconductor photodetector integrated with the scintillator, in which a scintillator to be prepared includes a pair of end surfaces opposing each other in a first direction and one side surface coupling the pair of end surfaces, has a length in the first direction which is longer than a length in a second direction orthogonal to the one side surface, the one side surface having a length in the first direction which is longer than a width of the one side surface in a third direction orthogonal to the first direction and the second direction, the semiconductor photodetector to be prepared includes one semiconductor substrate including a first main surface and a second main surface opposing to each other, and the one semiconductor substrate includes a first portion in which photodetection regions are disposed, and a second portion disposed with the first portion in a direction orthogonal to a direction in which the first main surface and the second main surface oppose each other, each of the photodetection regions includes a plurality of avalanche photodiodes arranged to operate in Geiger mode and a plurality of quenching resistors electrically connected in series with one of an anode or a cathode of a corresponding avalanche photodiode of the plurality of avalanche photodiodes, the integrating of the scintillator and the semiconductor photodetector includes integrating the scintillator and the semiconductor photodetector such that the one side surface and the first main surface oppose each other and the first portion is covered with the one side surface and the second portion is exposed from the scintillator, and applying a resin such that the scintillator and the second portion are in contact with each other, and the thinning of the semiconductor photodetector includes thinning the one semiconductor substrate from the second main surface side.

(Producing Method 2)

The method for producing a radiation detector according to Producing Method 1, further including:

preparing a wiring member; and electrically connecting the wiring member to the semiconductor photodetector, in which the semiconductor photodetector to be prepared further includes a first electrode and a second electrode disposed in the second portion, the first electrode is connected in parallel with the plurality of quenching resistors, and the second electrode is connected in parallel with the other of the anode or the cathode of each of the plurality of avalanche photodiodes, the wiring member to be prepared includes a first conductor and a second conductor, the electrical connecting of the wiring member includes
connecting the first conductor to the first electrode and
connecting the second conductor to the second electrode, and the applying of the resin includes applying the resin to be
in contact with a portion position on the second portion,
the portion being included in the wiring member electrically connected to the semiconductor photodetector.

(Producing Method 3)

The method for producing a radiation detector according
to Producing Method 1, in which the scintillator to be prepared further includes another side
surface opposing the one side surface, the semiconductor photodetector to be prepared includes
a first semiconductor photodetector and a second semiconductor photodetector, the first semiconductor photodetector includes the one semiconductor substrate
including the first portion and the second portion, the
second semiconductor photodetector includes another
semiconductor substrate including a first main surface
and a second main surface opposing each other, and the
other semiconductor substrate includes a third portion
in which the photodetection regions are disposed, and
a fourth portion disposed with the third portion in the
direction orthogonal to a direction in which the first
main surface and the second main surface oppose each
other, integrating the scintillator and the semiconductor photodetector includes integrating the scintillator and the first semiconductor
photodetector such that the one side surface and the
first main surface oppose each other, the first portion is
covered with the one side surface, and the second
portion is exposed from the scintillator, integrating the scintillator and the second semiconductor
photodetector such that the other side surface and the
first main surface oppose each other, the third portion
is covered with the other side surface, and the fourth
portion is exposed from the scintillator, and applying the resin to be in contact with the scintillator and
the second portion of the one semiconductor substrate
included in the first semiconductor photodetector, and
to be in contact with the scintillator and the fourth
portion of the other semiconductor substrate included
in the second semiconductor photodetector, and the thinning of the semiconductor photodetector includes
thinning the one semiconductor substrate included in
the first semiconductor photodetector from the second
main surface side, and thinning the other semiconductor substrate included in the second semiconductor
photodetector from the second main surface side.

(Producing Method 4)

The method for producing a radiation detector according
to Producing Method 3, further including:

preparing a wiring member; and electrically connecting the wiring member to the semiconductor photodetector, in which the first semiconductor photodetector further includes a
first electrode and a second electrode disposed in the
second portion, and the second semiconductor photodetector further includes a third electrode and a fourth
electrode disposed in the fourth portion, the first electrode is connected in parallel with the plurality of quenching resistors, and the second electrode
is connected in parallel with the other of the anode or
the cathode of each of the plurality of avalanche
photodiodes, the third electrode is connected in parallel with the
plurality of quenching resistors, and the fourth electrode is connected in parallel with the other of the
anode or the cathode of each of the plurality of avalanche photodiodes, the wiring member to be prepared includes a first wiring
member and a second wiring member including a first
conductor and a second conductor, respectively, the electrical connecting of the wiring member includes
connecting the first conductor of the first wiring member to the first electrode, connecting the second conductor of the first wiring member to the second electrode, connecting the first conductor of the second
wiring member to the third electrode, and connecting
the second conductor of the second wiring member to
the fourth electrode, and the applying of the resin includes applying the resin to be
in contact with a portion of the first wiring member
electrically connected to the first semiconductor photodetector, the portion being positioned on the second
portion, and a portion of the second wiring member
electrically connected to the second semiconductor
photodetector, the portion being positioned on the
fourth portion.

The embodiments and the modification example of the
present invention have been described above; however, the
present invention is not absolutely limited to the above-described embodiments and can be variously modified without departing from the gist of the present invention.

In the radiation detector RD1, when viewed in the second
direction D2, the photodetection regions 23a, 23b, 23c, and
23d do not need to have the outline shapes corresponding to
the outline shape of the side surface 1c or 1d. In the
configuration in which the photodetection regions 23a, 23b,
23c, and 23d have the outline shape corresponding to the
outline shape of the side surface 1c or 1d, as described
above, the photodetection regions 23a, 23b, 23c, and 23d
tend not to be disposed at positions of the semiconductor
substrate 11a or 11b where no scintillation lights can be
received. Therefore, increase in dark count and capacitance
in the photodetection regions 23a, 23b, 23c, and 23d
included in the semiconductor substrate 11a or 11b is
curbed. Therefore, this configuration more reliably improves
the time resolution of the radiation detector RD1.

The radiation detector RD1 does not need to include the
light reflecting member 24. In the configuration in which the
radiation detector RD1 includes the light reflecting member
24, as described above, the scintillation light generated in
each of the portions 1p, 1q, 1r, and 1s is reliably confined in
the corresponding portion 1p, 1q, 1r, or 1s. The photodetection regions 23a, 23b, 23c, and 23d corresponding to the
portions 1p, 1q, 1r, and 1s more reliably detect scintillation
lights generated in the portions 1p, 1q, 1r, and 1s. Therefore,
the radiation detector RD1 still more reliably achieves high
time resolution.

The width of the conductive wire 14a electrically connecting the electrode 17a corresponding to the photodetection region 23a and the photodetection region 23a may be
larger than the width of the conductive wire 14d electrically
connecting the electrode 17d corresponding to the photodetection region 23d and the photodetection region 23d. In the
configuration in which the width of the conductive wire 14a
electrically connecting the electrode 17a corresponding to
the photodetection region 23a and the photodetection region
23a is larger than the width of the conductive wire 14d
electrically connecting the electrode 17d corresponding to
the photodetection region 23d and the photodetection region 23d, as described above, the electrical resistance difference between the conductive wire 14a electrically connecting the electrode 17a corresponding to the photodetection region 23a and the photodetection region 23a and the conductive wire 14d electrically connecting the electrode 17d corresponding to the photodetection region 23d and the photodetection region 23d is reduced.

The radiation detector RD1 does not need to include the base 40a. The configuration in which the radiation detector RD1 includes the base 40a improves the mechanical strength of the semiconductor substrate 11a as described above. The radiation detector RD1 does not need to include the base 40b. The configuration in which the radiation detector RD1 includes the base 40b improves the mechanical strength of the semiconductor substrate 11b as described above. Therefore, this configuration reliably realizes the radiation detector RD1 having high mechanical strength.

The radiation detector RD1 does not need to include the reinforcement body 45. In the configuration in which the radiation detector RD1 includes the reinforcement body 45, as described above, the reinforcement body 45 disposed between the portion 22a and the portion 22b improves the mechanical strength of the portion 22a and the portion 22b. The reinforcement body 45 protects the wiring member 30a positioned in the portion 22a and the wiring member 30b positioned in the portion 22b.

The radiation detector RD1 does not need to include the cover bodies 47a and 47b. When the radiation detector RD1 includes the cover bodies 47a and 47b, for example, the configuration in which each of the cover body 47a and the cover body 47b includes the light reflector 48 improves the light reflection characteristics of the scintillation light. For example, a configuration in which each of the cover body 47a and the cover body 47b includes the electrical insulator 49 improves electrical insulation between the radiation detectors RD1.

The wiring member 30a does not need to be disposed on the same side as the scintillator 1 relative to the semiconductor substrate 11a. In a configuration in which the wiring member 30a is disposed on the same side as the scintillator 1 relative to the semiconductor substrate 11a, there is no need to provide a substrate for connecting the wiring member 30a to the electrodes 17 and 18 included in the semiconductor photodetector 10a through die bonding, for example. The wiring member 30b does not need to be disposed on the same side as the scintillator 1 relative to the semiconductor substrate 11b. In a configuration in which the wiring member 30b is disposed on the same side as the scintillator 1 relative to the semiconductor substrate 11b, there is no need to provide a substrate for connecting the wiring member 30b and the electrodes 17 and 18 included in the semiconductor photodetector 10b through die bonding, for example. Therefore, this configuration more reliably simplifies the configuration of the radiation detector RD1.

The flexibility of the wiring member 30a does not need to be higher than the flexibility of the semiconductor substrate 11a. In a configuration in which the flexibility of the wiring member 30a is higher than the flexibility of the semiconductor substrate 11a, vibration of the wiring member 30a tends not to be transmitted to the semiconductor substrate 11a. The flexibility of the wiring member 30b does not need to be higher than the flexibility of the semiconductor substrate 11b. In a configuration in which the flexibility of the wiring member 30b is higher than the flexibility of the semiconductor substrate 11b, as described above, vibration of the wiring member 30b tends not to be transmitted to the semiconductor substrate 11b. Therefore, this configuration reliably maintains the mechanical strength of the radiation detector RD1.

In the embodiments and the modification example, the example in which the semiconductor photodetectors are disposed on the two side surfaces 1c and 1d of the scintillator 1, respectively, has been described, but the semiconductor photodetectors may be disposed on the four side surfaces 1c, 1d, 1e, and 1f of the scintillator 1, respectively.

REFERENCE SIGNS LIST

1 Scintillator
1a, 1b End surface
1c, 1d, 1e, 1f Side surface
1p, 1q, 1r, 1s Portion
3a, 3b Opposing surface
3c, 3e Coupling surface
3a, 3b Opposing surface
10a, 10b Semiconductor photodetector
11a, 11b Semiconductor substrate
12 Avalanche photodiode
13 Quenching resistor
14a, 14b Conductive wire
17a, 17b, 17c, 17d, 18 Electrode
21a, 21b Portion
22a, 22b Portion
23a, 23b, 23c, 23d Photodetection region
24 Light reflecting member
30a, 30b Wiring member
31a, 31b, 31c, 31d, 32 Conductor
41a, 41b, 41c, 41d, 42 Terminal
45 Reinforcement body
47a, 47b Cover body
48 Light reflector
49 Electrical insulator
51a, 51b, 52a, 52b Portion
D1 First direction
D2 Second direction
D3 Third direction
RA1, RA2 Radiation detector array
RD1 Radiation detector

The invention claimed is:

1. A radiation detector comprising:
a scintillator including a pair of end surfaces opposing each other in a first direction, and a first side surface and a second side surface opposing each other in a second direction intersecting the first direction and coupling the pair of end surfaces, the scintillator having a rectangular shape when viewed in the first direction;
a first semiconductor photodetector including a first semiconductor substrate disposed to oppose the first side surface;
a second semiconductor photodetector including a second semiconductor substrate disposed to oppose the second side surface;
a first wiring member electrically connected to the first semiconductor photodetector; and
a second wiring member electrically connected to the second semiconductor photodetector, wherein
a length of the scintillator in the first direction is longer than both of a length of the scintillator in the second direction and a length of the scintillator in a third direction parallel to the first side surface,
a length of the first side surface in the first direction is longer than a width of the first side surface in the third direction,

47

48 a length of the second side surface in the first direction is longer than a width of the second side surface in the third direction, the first semiconductor substrate includes a first portion covered with the first side surface, and a second portion disposed with the first portion in the first direction and exposed from the first side surface, the second semiconductor substrate includes a third portion covered with the second side surface, and a fourth portion disposed with the third portion in the first direction and exposed from the second side surface, each of the first semiconductor photodetector and the second semiconductor photodetector includes a plurality of photodetection regions including at least one avalanche photodiode arranged to operate in Geiger mode, and at least one quenching resistor electrically connected in series with one of an anode or a cathode of a corresponding avalanche photodiode of the at least one avalanche photodiode, the first semiconductor photodetector includes a plurality of first electrodes electrically connected to the at least one quenching resistor included in the first semiconductor photodetector and included in a corresponding photodetection region of the plurality of photodetection regions, and a second electrode electrically connected to another of the anode or the cathode of the avalanche photodiode included in the first semiconductor photodetector and included in the corresponding photodetection region of the plurality of photodetection regions, the second semiconductor photodetector includes a plurality of third electrodes electrically connected to the at least one quenching resistor included in the second semiconductor photodetector and included in the corresponding photodetection region of the plurality of photodetection regions, and a fourth electrode electrically connected to another of the anode or the cathode of the avalanche photodiode included in the second semiconductor photodetector and included in the corresponding photodetection region of the plurality of photodetection regions, the plurality of photodetection regions included in the first semiconductor photodetector are disposed in the first portion, the plurality of first electrodes and the second electrode are disposed in the second portion, the plurality of photodetection regions included in the second semiconductor photodetector are disposed in the third portion, the plurality of third electrodes and the fourth electrode are disposed in the fourth portion, the first wiring member includes a plurality of conductors electrically connected to a corresponding first electrode of the plurality of first electrodes, and a conductor connected to the second electrode, and the second wiring member includes a plurality of conductors electrically connected to at least one of the third electrodes of the plurality of third electrodes, and a conductor connected to the fourth electrode.

2. The radiation detector according to claim 1, wherein when viewed in the second direction, one region formed by outline of the plurality of photodetection regions included in the first semiconductor substrate has an outline shape corresponding to an outline shape of the first side surface, and when viewed in the second direction, one region formed by outline of the plurality of photodetection regions included in the second semiconductor substrate has an outline shape corresponding to an outline shape of the second side surface.

3. The radiation detector according to claim 1, wherein the scintillator includes a plurality of portions disposed independently of each other in the first direction, each of the plurality of portions is positioned corresponding to a corresponding photodetection region of the plurality of photodetection regions disposed in each of the first semiconductor substrate and the second semiconductor substrate, each of the plurality of portions includes a pair of opposing surfaces that oppose each other in the first direction, and a first coupling surface and a second coupling surface that couple the pair of opposing surfaces, the first coupling surface oppose the first semiconductor substrate, and the second coupling surface oppose the second semiconductor substrate and oppose the first coupling surface in the second direction.

4. The radiation detector according to claim 3, wherein the plurality of portions are joined to each other.

5. The radiation detector according to claim 4, further comprising a light reflecting member, wherein the light reflecting member is disposed between the plurality of portions.

6. The radiation detector according to claim 3, wherein, when viewed in the second direction, each of the plurality of photodetection regions included in the first semiconductor substrate has an outline shape corresponding to an outline shape of the first coupling surface of a corresponding portion of the plurality of portions, the first coupling surface that opposes the first semiconductor substrate, and when viewed in the second direction, each of the plurality of photodetection regions included in the second semiconductor substrate has an outline shape corresponding to an outline shape of the second coupling surface of a corresponding portion of the plurality of portions, the second coupling surface that opposes the second semiconductor substrate.

7. The radiation detector according to claim 1, wherein the plurality of photodetection regions include a first photodetection region and a second photodetection region closer to the second portion than the first photodetection region, a width of a conductive wire electrically connecting the first electrode corresponding to the first photodetection region and the first photodetection region is larger than a width of a conductive wire electrically connecting the first electrode corresponding to the second photodetection region and the second photodetection region, and a width of a conductive wire electrically connecting the third electrode corresponding to the first photodetection region and the first photodetection region is larger than a width of a conductive wire electrically connecting the third electrode corresponding to the second photodetection region and the second photodetection region.

8. The radiation detector according to claim 1, further comprising a reinforcement body disposed between the second portion and the fourth portion, wherein the reinforcement body covers the second portion and the fourth portion and couples the second portion and the fourth portion.

9. The radiation detector according to claim 1, wherein the first semiconductor substrate includes a first surface opposing the scintillator in the second direction and a second surface opposing the first surface in the second direction, the second semiconductor substrate includes a third surface opposing the scintillator in the second direction and a fourth surface opposing the third surface in the second direction, and the second surface and the fourth surface include polished surfaces.

10. The radiation detector according to claim 1, further comprising:

a first base including a fifth surface and a sixth surface opposing each other in the second direction and be disposed such that the first semiconductor substrate is positioned between the fifth surface and the scintillator;

a second base including a seventh surface and an eighth surface opposing each other in the second direction and be disposed such that the second semiconductor substrate is positioned between the seventh surface and the scintillator;

a plurality of first terminals disposed on the fifth surface;

a second terminal disposed on the fifth surface;

a plurality of third terminals disposed on the seventh surface;

a fourth terminal disposed on the seventh surface;

a first wire electrically connecting each of the plurality of first terminals and each of the first electrodes;

a second wire electrically connecting the second terminal and the second electrode;

a third wire electrically connecting each of the plurality of third terminals and each of the third electrodes; and a fourth wire electrically connecting the fourth terminal and the fourth electrode, wherein the first base includes a fifth portion covered with the first semiconductor substrate and a sixth portion disposed with the fifth portion in the first direction and exposed from the first semiconductor substrate, the second base includes a seventh portion covered with the second semiconductor substrate and an eighth portion disposed with the seventh portion in the first direction and exposed from the second semiconductor substrate, the first terminals and the second terminal are positioned on the sixth portion, and the third terminals and the fourth terminal are positioned on the eighth portion.

11. The radiation detector according to claim 10, wherein at least a part of the first wiring member and the scintillator are disposed in front of the same surface of the first base, and at least a part of the second wiring member and the scintillator are disposed in front of the same surface of the second base.

12. The radiation detector according to claim 1, further comprising:

a first cover body disposed such that the first semiconductor substrate is positioned between the first cover body and the scintillator; and a second cover body disposed such that the second semiconductor substrate is positioned between the second cover body and the scintillator, wherein each of the first cover body and the second cover body includes at least one of a light reflector and an electrical insulator.

13. The radiation detector according to claim 1, wherein the first wiring member is disposed on the same side as the scintillator relative to the first semiconductor substrate, and the second wiring member is disposed on the same side as the scintillator relative to the second semiconductor substrate.

14. The radiation detector according to claim 1, wherein at least a part of the first wiring member and the scintillator are disposed in front of the same surface of the first semiconductor substrate, and at least a part of the second wiring member and the scintillator are disposed in front of the same surface of the second semiconductor substrate.

15. The radiation detector according to claim 1, wherein the first wiring member and the second wiring member and the first semiconductor substrate and the second semiconductor substrate have flexibility, the flexibility of the first wiring member is higher than the flexibility of the first semiconductor substrate, and the flexibility of the second wiring member is higher than the flexibility of the second semiconductor substrate.

16. A radiation detector array comprising a plurality of radiation detectors disposed one-dimensionally, wherein each of the plurality of radiation detectors is the radiation detector according to claim 1, the scintillator further includes a pair of third side surfaces coupling the pair of end surfaces and coupling the first side surface and the second side surface, and any two radiation detectors adjacent to each other of the plurality of radiation detectors are disposed such that the third side surface of the scintillator included in one radiation detector and the third side surface of the scintillator included in another radiation detector oppose each other.

17. The radiation detector array according to claim 16, wherein the first semiconductor photodetectors included in the plurality of radiation detectors are integrally formed, and the second semiconductor photodetectors included in the plurality of radiation detectors are integrally formed.

18. A radiation detector array comprising a plurality of radiation detectors disposed two-dimensionally in a matrix, wherein each of a plurality of radiation detectors disposed in a row direction of the plurality of radiation detectors is the radiation detector array according to claim 16, and any two radiation detectors adjacent to each other in a column direction of the plurality of radiation detectors are disposed such that either the first semiconductor photodetector or the second semiconductor photodetector included in one radiation detector and either the first semiconductor photodetector or the second semiconductor photodetector included in the other radiation detector oppose each other in the column direction.

19. A radiation detector array comprising a plurality of radiation detectors disposed one-dimensionally, wherein each of the plurality of radiation detectors is the radiation detector according to claim 1, the scintillator further includes a pair of third side surfaces coupling the pair of end surfaces and coupling the first side surface and the second side surface, and any two radiation detectors adjacent to each other of the plurality of radiation detectors are disposed such that the third side surface of the scintillator included in one radiation detector and either the first semiconductor photodetector or the second semiconductor photodetector included in the other radiation detector oppose each other.

20. A radiation detector array comprising a plurality of radiation detectors disposed two-dimensionally in a matrix, wherein each of a plurality of radiation detectors disposed in a row direction of the plurality of radiation detectors is the radiation detector array according to claim 19, and any two radiation detectors adjacent to each other in a column direction of the plurality of radiation detectors are disposed such that the third side surface of the scintillator included in one radiation detector and either the first semiconductor photodetector or the second semiconductor photodetector included in the other radiation detector oppose each other in the column direction.

* * * * *